(12) United States Patent
Gil et al.

(10) Patent No.: US 7,380,234 B2
(45) Date of Patent: May 27, 2008

(54) IMPLEMENTING VIRTUAL BASES WITH FIXED OFFSETS IN OBJECT ORIENTED APPLICATIONS

(75) Inventors: Joseph Gil, Haifa (IL); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/807,678

(22) Filed: Mar. 24, 2004

(65) Prior Publication Data

US 2004/0187094 A1    Sep. 23, 2004

Related U.S. Application Data

(63) Continuation of application No. 09/425,697, filed on Oct. 22, 1999, now Pat. No. 6,754,887.

(51) Int. Cl.
G06F 9/44 (2006.01)
(52) U.S. Cl. .................. 717/108; 717/116; 717/144
(58) Field of Classification Search ........... 717/108, 717/116, 140–144
See application file for complete search history.

(56) References Cited

U.S. PATENT DOCUMENTS

| | | | |
|---|---|---|---|
| 5,535,391 A * | 7/1996 | Hejlsberg et al. | 717/140 |
| 5,590,327 A | 12/1996 | Biliris et al. | |
| 5,790,861 A * | 8/1998 | Rose et al. | 717/145 |
| 5,794,041 A | 8/1998 | Law et al. | |
| 6,161,217 A * | 12/2000 | Detlefs et al. | 717/141 |
| 6,317,796 B1 * | 11/2001 | Bak et al. | 719/315 |
| 6,507,946 B2 * | 1/2003 | Alexander et al. | 717/145 |
| 6,754,887 B1 * | 6/2004 | Gil et al. | 717/116 |

OTHER PUBLICATIONS

Principles of Object-Oriented Analysis And Design, James Martin, Jun. 1, 1992, p. 269.*
Incide the C++ Object Model, Stanley B. Lippman, 1996, pp. 1-29, 31-49,95-106,144-149, 159-165,172-196.*
"Space and Time Efficient Memory Layout for Multiple Inheritance", Joseph Gil et al, IBM T.J. Watson research Center, ACM, pp. 256-275.*
Pugh et. al., "Two-directional record layout for multiple inheritance", Proceedings of the ACM SIGPLAN '90 Conference on Programming Language Design and Implementation, White Plains, NY, Jun. 20-22, 1990, pp. 85-91.

(Continued)

*Primary Examiner*—Todd Ingberg
(74) *Attorney, Agent, or Firm*—F. Chau & Associates, LLC

(57) ABSTRACT

A method for implementing virtual bases with fixed offsets in a class hierarchy graph, having nodes representing object classes and edges representing immediate inheritance therebetween, corresponding to an object oriented program includes determining whether a set N including all nodes is empty. A node x is removed from N, when N is not empty. It is determined whether a set Y is empty, Y including nodes that directly and virtually inherit from x. When Y is empty, return to determining whether N is empty, otherwise a node y is removed from Y. It is determined whether y is duplicated. When y is duplicated, return to determining whether Y is empty, otherwise an edge e, representing that y virtually inherits from x, is replaced with an edge e', representing that x has a fixed offset with respect to y. Upon replacing e, return to determining whether N is empty.

21 Claims, 26 Drawing Sheets

OTHER PUBLICATIONS

Erik Ernst, "Propagating Class and Method Combination", Proceedings of the 13th European Conference on Object-Oriented Programming (ECOOP'99), Lecture Notes in Computer Science, Lisbon, Portugal, Jun. 1999, R. Guerraoui, ed., Springer Verlag, pp. 67-91.

Burke et. al., "A Framework for Evaluating Space and Time Overhead for C++ Object Models", Research Report RC 20421, IBM, TJ Watson Research Center, Mar. 1996, Declassified Jan. 1998, pp. 1-28.

Cardelli et. al., "On Understanding Types, Data Abstraction, and Polymorphism", Computing Surveys, vol. 17, No. 4, Dec. 1985, pp. 471-522.

Gil et. al., "The Complexity of Type Analysis of Object Oriented Programs", Proceedings of the 12th European Conference on Object-Oriented Programming (ECOOP'98), Lecture Notes in Computer Science, Brussels, Belgium, Jul. 1998, E.Jul., editor, Springer Verlag, pp. 601-634.

Carter et. al., "Universal Class of Hash Functions", Journal of Computer and System Sciences 18, (1979) pp. 143-154.

Chambers et. al., "Whole-Program Optimization of Object-Oriented Languages", Technical Report UW-CSE-96-06-02, U. of Wash., Dept. of Computer Science and Engineering, Jun. 1996, pp. 1-70.

Nackman et. al., "Base-Class Composition with Multiple Derivation and Virtual Bases", Proceedings of the Sixth Usenix C++ Technical Conference, Cambridge, MA, Apr. 11-14, 1994, pp. 57-71.

Karasick et. al., "The Architecture of Montana: An Open and Extensible Programming Environment with an Incremental C++ Compiler", Proceedings of the Foundations of Software Engineering (FSE'98), Orlando, FL., Nov. 1997, pp. 131-142.

Garey et.al., "Computers and Intractability: A Guide to the Theory of NP-Completeness", W.H. Freeman and Co., pp. 1-15, 194-195, 1979.

Tip et. al., "Class Hierarchy Specialization", Proceedings of the Twelfth Annual Conference on Object-Oriented Programming Systems, Languages, and Applications (OOPSLA'97), Atlanta GA, pp. 271-285, Oct. 1997 (also published in ACM SIGPLAN Notices 32(10), 1997).

S. Krogdahl, "Multiple Inheritance in Simula-Like Languages", BIT 25, pp. 318-326, 1984.

A. Myers, "Bidirectional Object Layout for Separate Compilation", Proceedings of the 10th Annual Conference on Object-Oriented Programming Systems, Languages, and Applications (OOPSLA'95), pp. 124-139, Austin, Texas, USA, Oct. 15-19, 1995 (also published in ACM SIGPLAN Notices 30(10), Oct. 1995).

Rossie, Jr., et. al., "An Algebraic Semantics of Subobjects", Proceedings of the 10th Annual Conference on Object-Oriented Programming Systems, Languages, and Applications (OOPSLA'95), pp. 187-199, Austin, Texas, USA, Oct. 15-19, 1995 (also published in ACM SIGPLAN Notices 30(10) Oct. 1995).

Sweeney, et. al., "A Methodology for Quantifying and Evaluating the Space Overhead in C++ Object Models", Computer Sciences/Mathematics RC 21370 (96227) (Dec. 18, 1998) pp. 1-24.

Stanley B. Lippman, "Inside the C++ Object Model", Addison-Wesley, second edition, 1996, pp. 82-107.

B. Stroustrup, "The Design and Evolution of C++", Addison-Wesley, Mar. 1994, pp. 257-276.

Ellis, et.al, The Annotated C++ Reference Manual, Addison-Wesley, Jan. 1994, pp. 195-237.

Krall, et. al., "Near Optimal Hierarchical Encoding of Types", Proceedings of the 11th European Conference on Object-Oriented Programming (ECOOP'97) Lecture Notes in Computer Science, Jyvaskyla, Finland, Jun. 1997, Mehmit Aksit, Satoshi Matsuoka (eds.), Springer Verlag, pp. 128-145.

Flatt, et. al., "Classes and Mixins", POPL 98, San Diego, CA, pp. 171-183.

Linton, et. al., "Interface Translation and Implementation Filtering", Usenix Association, C++ Technical Conference Proceedings, Cambridge, MA, Apr. 11-14, 1994, pp. 227-236.

B. Martin, "The Separation of Interface and Implementation in C++", Usenix Association, C++ Conference, pp. 51-63, 1991.

B. Stroustrup, "Multiple Inheritance for C++", European Unix System User's Group Conference, May 1987, pp. 189-207.

* cited by examiner $a_1$
$a_2$
⋮
$a_{n-1}$
$a_n$

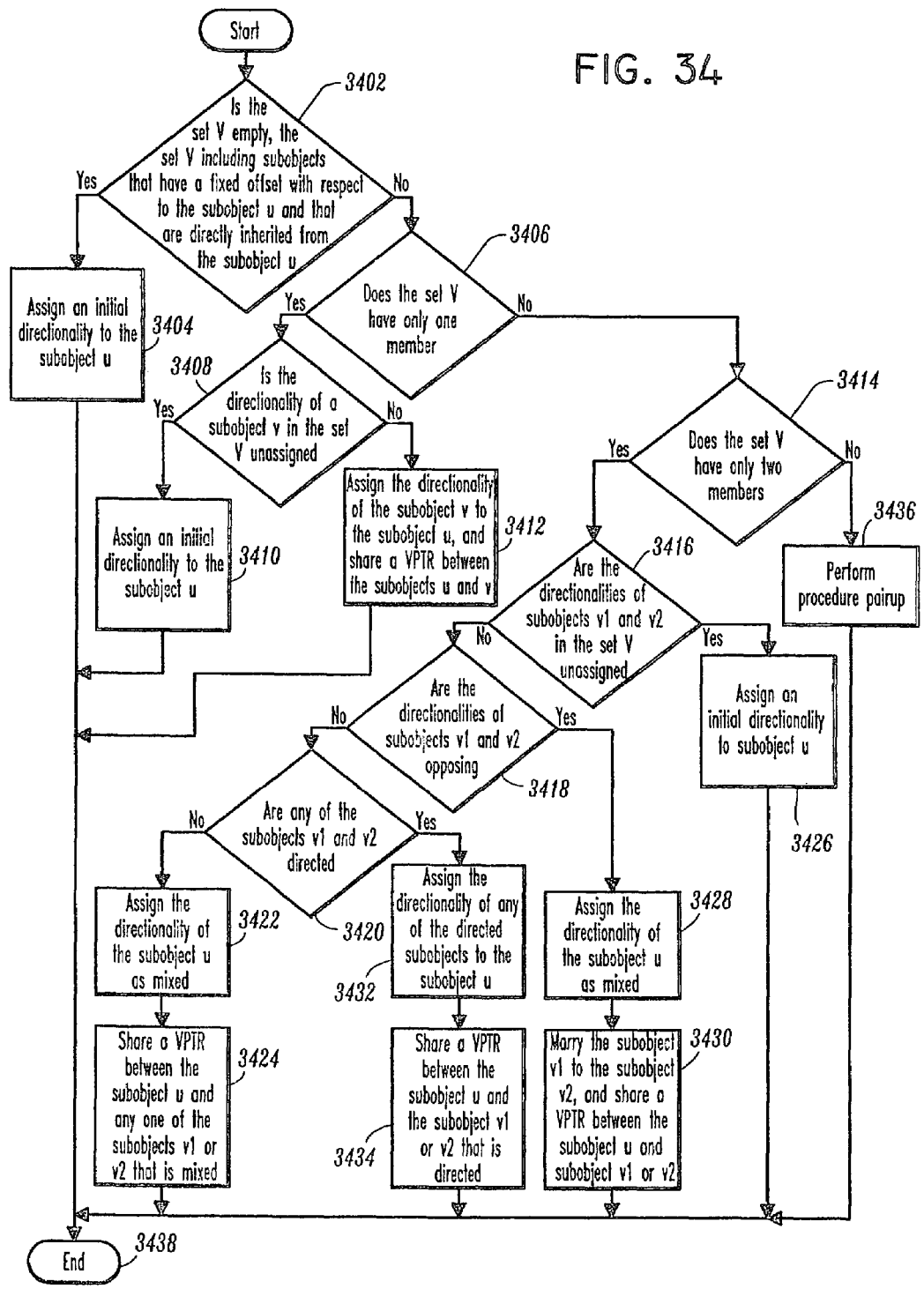

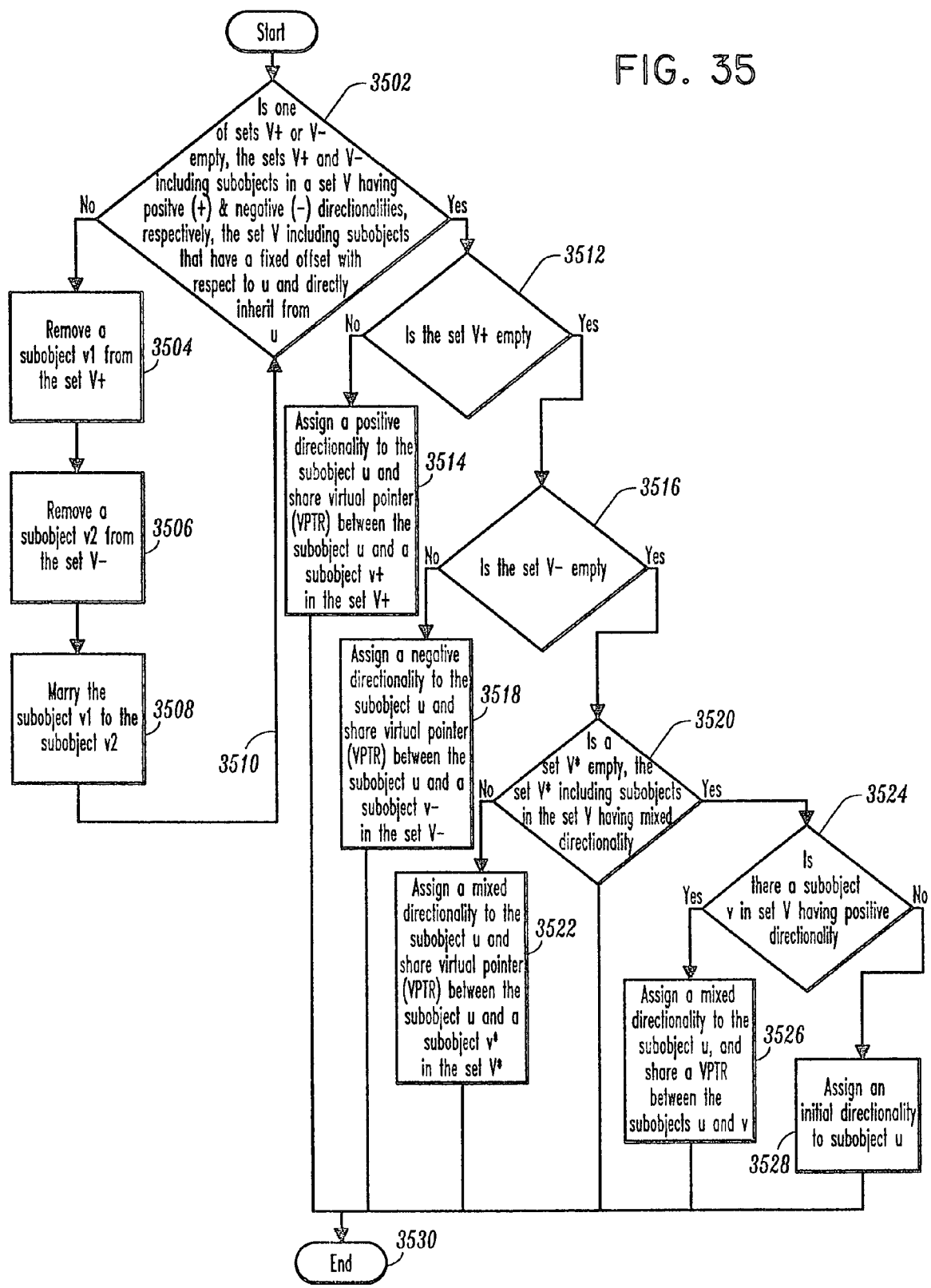

IMPLEMENTING VIRTUAL BASES WITH FIXED OFFSETS IN OBJECT ORIENTED APPLICATIONS

This application is a Continuation of U.S. application Ser. No. 09/425,697, filed on Oct. 22, 1999 now U.S. Pat. No. 6,754,887.

CROSS-REFERENCE TO RELATED APPLICATIONS

This application is related to the application entitled "Methods for Laying Out Memories Bidirectionally for Object Oriented Applications", which is commonly assigned and is filed concurrently with the present invention.

BACKGROUND

1. Technical Field

The present invention relates generally to object-oriented programming (OOP) and, in particular, to methods for implementing virtual bases with fixed offsets in object oriented applications.

2. Background Description

Object oriented programming (OOP) is the preferred environment for building user-friendly, intelligent computer software. The object oriented paradigm is a programming paradigm in which the world is modeled as a collection of self-contained objects that interact by sending messages. Objects are modules that contain data and all functions (code) that are allowed to be performed on the encapsulated data. Objects are defined by class (type), which determine everything about an object. Moreover, objects are considered as individual instances of a class.

Examples of OOP languages include C++, SMALLTALK, and JAVA, among others. C++ is an object oriented version of C. It is compatible with C, so that existing C code can be incorporated into C++ programs.

SMALLTALK is a pure object oriented language. In SMALLTALK, a message is sent to an object to evaluate the object itself. Messages perform a task similar to that of function calls in conventional programming languages. The programmer does not need to be concerned with the type of data. Rather, the programmer need only be concerned with creating the right order of a message and using the message.

JAVA is designed as a portable object oriented language that can run on any web-enabled computer via that computer's Web browser. As such, it offers great promise as the standard Internet and Intranet programming language. JAVA is an interpreted language that uses an intermediate language. The source code of a JAVA program is compiled into "byte code", which cannot be run by itself. The byte code must be converted into machine code at runtime. Upon finding a JAVA applet, the Web browser switches to its JAVA interpreter (JAVA Virtual Machine) which translates the byte code into machine code and runs it. This means JAVA programs are not dependent on any specific hardware and will run in any computer with the JAVA virtual machine. For a detailed reference describing JAVA, see "The JAVA Programming Language", K. Arnold and J. Gosling, The JAVA Series, Addison-Wesley, 1996.

There are several key elements that characterize OOP. They include virtual functions, polymorphism, and inheritance. These elements are used to generate a graphical user interface (GUI), typically characterized by a windows environment having icons, mouse cursors, and menus. While these three key elements are common to OOP languages, most OOP languages implement the three elements differently.

A virtual function is a function that has a default operation for a parent (base) class, but which can be overridden to perform a different operation by a child (derived) class. Thus, implicit in virtual function invocation is the idea that the execution of a virtual function can vary with different objects, i.e., the behavior and response that the invocation elicits will depend on the object through which the function is invoked.

Polymorphism refers to the substitutability of related objects. Objects are "related" if they have a similar "type", and in most object-oriented languages that means that they are instances of the same class, or they have a common parent class through inheritance. Polymorphism allows this shared code to be tailored to fit the specific circumstances of each individual data type.

Inheritance lets classes be defined in terms of other classes. Thus, inheritance allows different classes to share the same code, leading to a reduction in code size and an increase in functionality. A class that inherits from another class is called a "subclass" or "child" of the other class (which is called the "superclass" or "parent class"). The subclass responds to the same messages as its parent, and it may respond to additional messages as well. The subclass "inherits" its implementation from its parent, though it may choose to reimplement some methods and/or add more data. Inheritance lets programmers define new classes easily as incremental refinements of existing ones.

There are various types of inheritance in OOP. Single inheritance corresponds to a class that has no more than one parent (base) class. Multiple inheritance corresponds to a class that can contain more than one parent. Virtual inheritance is when a base class inherited along distinct paths occurs only once in the derived class. That is, the (derived) sub-object is not replicated. Non-virtual inheritance is when the base class has multiple distinct occurrences in the derived class. That is, the (derived) sub-object is replicated.

Virtual and non-virtual inheritance are phrases employed with respect to the C++ programming language. However, such inheritances exist in other object-oriented programming languages, although they may be referred to by different phrases. For example, virtual and non-virtual inheritance correspond to shared and repeated inheritance, respectively, in the Eiffel programming language.

A brief description of multiple inheritance with respect to the C++ programming language will now be given. As noted by B. Stroustrup, in The C++ Programming Language, Addison-Wesley, 3rd Ed. (1997), the C++ syntax forces a programmer to select the kind (or semantics) of inheritance, virtual and non-virtual, when the inheritance occurs. That is, the derived class must specify whether the base class is inherited nonvirtually or virtually.

This selection forces the programmer to anticipate all possible contexts in which the classes may be further derived and allows only one choice for all of them. In the case of extendible libraries or any classes that have the potential to be further derived, the programmer is inclined therefore to conservatively specify the type of all occurrences of inheritance as virtual since no assumption of how the classes may be derived in the future are possible.

This predicament is made even greater by the non-negligible toll, both in terms of space and time resources, taken by the standard implementation of virtual inheritance in C++. This toll is further described by Ellis and B. Stroustrup, in The Annotated C++ Reference Manual, Addison-Wesley, January 1994. The representation of each object of any class must include the set of offsets to all of its virtual base classes. Although these offsets can be shared among objects of the same class by storing the offsets in class tables, time-efficient implementations will repeatedly store these offsets, usually as pointers, in each instance of the class. Furthermore, these pointers are not usually shared across virtual inheritance. The time penalty is incurred when these pointers are to be dereferenced e.g., in an upcast, a call to an inherited (even nonvirtual) member function, or in reference to data members of the virtual base. These operations require at least one indirection, and two indirections in the implementation where the offsets are stored per class and not per object.

A brief description of some of the terminology and notations used herein will now be given. Moreover, some of the various graphical notations used herein with respect inheritance hierarchies, object layout diagrams and subobject graphs are illustrated in FIG. 1. The nouns "instance" and "object" are used interchangeably, as are the verbs "inherit" and "derive". Since the implementation of virtual inheritance in the traditional layout scheme is the same, regardless of whether it is singular or multiple, we will sometimes use the term multiple inheritance in a loose sense, to also include single virtual inheritance.

Lower case letters from the beginning and the end of the Latin alphabet, e.g., $a_1, b_1, \ldots$ and $u_1, v_1, w_1, x_1, y_1, z$ denote classes. In addition, $u_1, v_1, w_1, x_1, Y_1, z$ are also used for denoting variables ranging over the domain of all classes, principally in procedures and theorems. By writing $x \leq y$ we mean that either $x=y$ or $x$ inherits, directly or indirectly from $y$. We say that $x$ is a descendant of $y$ and that $y$ is an ancestor or a base of $x$. The strict inequality $x<y$ is used to say that $x \leq y$ and $x = y$ or, in words, $x$ is a proper descendant of $y$ and $y$ is a proper ancestor of $x$.

Immediate (or direct) inheritance is denoted by $\lessdot$. Thus, $x \lessdot y$ means that $y$ is an immediate base of $x$, without specifying the kind of inheritance between $x$ and $y$. To state that $y$ is an immediate virtual (shared) base of $x$ we write $x \lessdot_v y$, whereas $x \lessdot_r y$ means that $y$ is an immediate nonvirtual (repeated) base of $x$.

We assume that a class cannot be an immediate base of another class more than once. This assumption makes it possible to model the inheritance hierarchy of an object oriented program as a graph, rather than a multi-graph. In such a graph, which is directed and acyclic, classes are represented as nodes and immediate inheritance is represented as edges. The relationship $x \lessdot y$ is represented by the edge $(x \lessdot y)$ leading from the node $x$ to the node $y$.

Although there are many variations to it, there is basically one common scheme for laying out C++ objects in memory. The scheme, which is hereinafter referred to as the traditional layout, is used by the vast majority of C++ compilers. Other languages that want to efficiently support multiple inheritance need a similar layout scheme.

A brief review of the traditional layout will now be given for the purpose of setting out the context in which the optimization techniques of the present invention take place. A more detailed description of the traditional layout can be found in standard textbooks such as: The Annotated C++ Reference Manual, Ellis and B. Stroustrup, Addison-Wesley, January 1994; Inside The C++ Object Model, S. B. Lippman, Addison-Wesley, second edition, 1996; and The Design and Evolution of C++, B. Stroustrup, Addison-Wesley, March 1994. The relative merits of the variants of this layout in terms of the space overhead they impose is described by P. Sweeney and M. Burke, in the above referenced article entitled "A Methodology for Quantifying and Evaluating the Space Overhead in C++ Object Models".

With respect to implementing multiple inheritance there are two language features that incur a space (and time) overhead: virtual functions; and virtual inheritance. Virtual functions are implemented using pointers to virtual function tables, which are described hereinbelow. Virtual inheritance is implemented using pointers to virtual bases, which are also described hereinbelow.

It will be shown herein that even though the traditional approach allows some reduction in the overhead of language feature information by sharing between subobjects with repeated inheritance, the overhead can still be quite high.

A description of the pointers to virtual function tables will now be given. In essence, the traditional layout prescribes that data members are laid out "unidirectionally" in an ascending order in memory, so that the data members of each class are laid out consecutively. Also, each object or subobject belonging to a class with virtual functions has a pointer, referred to as a VPTR, which points to the virtual function table (VTBL) of this class. Let us first discuss nonvirtual inheritance. The layout of a base class precedes that of a class derived from it. The VPTR is commonly laid out at offset zero, which makes it possible for the VPTR of an object to be shared with one of its directly inherited subobjects, so there is in total only one VPTR in the case of single inheritance.

However, several VPTRs occur in the case of multiple inheritance, since an object can share a VPTR with only one of its subobjects. Consider, for example, the inheritance hierarchy depicted in FIG. 2, which is a diagram of a class hierarchy illustrating repeated inheritance (i.e., multiple subobjects of the same type may occur in an object).

In this hierarchy, class e inherits from both c and d. Accordingly, the traditional layout of objects of class e has two VPTRs, as illustrated by the object layout chart in FIG. 3.

Examining FIG. 3 we see that the subobject of class d physically encompasses that of class b, which in turn encompasses one subobject of class a. All these three subobjects share one VPTR. Similar sharing occurs between the subobject of class c and the other subobject of class a. There are two subobjects of class a since the inheritance links in FIG. 2 are nonvirtual. Finally, an object of class e does not require its own VPTR( ), but shares its VPTR( ) with that of subobjects d, b, and a.

Taking a slightly wider perspective than that of C++, and adopting Eiffel terminology let us call this repeated inheritance. The Eiffel programming language is further discussed by B. Meyer, in Object-Oriented Software Construction, Prentice-Hall, second edition, 1997. In the current example, we may say that class a is repeatedly inherited by class e. A better visual illustration of this fact is given in FIG. 4, which is the subobject graph of class e of FIG. 2. The subobject graph was first introduced by J. Rossie Jr. and D. Friedman, in "An Algebraic Semantics of Subobjects", Proceedings of the 10$^{th}$ Annual Conference on Object-Oriented Programming Systems, Languages, and Applications (OOPSLA'95), pp. 187-199, Austin, Tex., USA, Oct. 15-19 1995 (also published in ACM SIGPLAN Notices 30(10) October 1995). This graph captures the containment relationships between subobjects. Evidently, the class a is drawn twice in this figure.

A description of the pointers to virtual bases will now be given. The traditional layout ensures that in repeated inheritance the offset of a subobject x is fixed with respect to any other encompassing subobject y irrespective of the context of y, i.e., the class of the object in which y itself occurs as a subobject. This is no longer true in the case of non-repeated inheritance, also known as shared inheritance, which is realized in C++ as virtual inheritance. The offset of a subobject of a virtual base class is context dependent. In order to locate such a subobject, be it for the purpose of data members access or an upcast, there is a virtual base pointer (or offset), referred to as a "VBPTR", stored in each object pointing to the subobject of the virtual base class. Consider for example the inheritance hierarchy of FIG. 5, which is a diagram of the class hierarchy of FIG. 2, with shared inheritance (i.e., a class inherited along distinct paths occurs only once in an object). In FIG. 5, classes b and c are virtually derived from class a. In this case, class e has only one subobject of class a.

FIG. 6 is a subobject graph of class e of FIG. 5. This graph makes it clear that there is only one subobject of class a, which is shared between the subobjects of classes b and c.

Even though virtual inheritance is a lingual mechanism designed to support a shared variant of multiple inheritance, the C++ semantics also allow single virtual inheritance. Thus, the fact that the in-degree of a class is greater than one in a subobject graph is a necessary but insufficient condition that the class is a virtual base. This is the reason behind the notational convention of drawing a circle around names of virtual bases, as was the case with class a in FIG. 6.

FIG. 7 is a diagram of the memory layout of objects of class e of FIG. 5, which shows how VBPTRs are used to realize the sharing of a VBPTR between subobjects of classes b and d. Examining FIG. 7, we can also see that since objects of class d occupy a contiguous memory space, it must be the case that the offset of the subobject of class a with respect to the data members of d is different in objects of class d than in objects of class e. Resuming our counting of VPTRs, we see that objects of class e have in total three VPTRs: two for the immediate parents of e, c and d; and one for the subobject of the virtual base a. The VPTR of d is also shared with e and b. In contrast, the VPTR of a cannot be shared with any of its descendants, since its relative offset with respect to these is not fixed.

As explained above, the offsets to virtual base classes must be stored in memory. In the variant described above these offsets are stored as VBPTRs in each instance of the class. A time penalty is incurred when these pointers are dereferenced for e.g., an upcast, a call to an inherited (even nonvirtual) member function, or in accessing a data member of the virtual base.

Alternatively, to reduce the space overhead, virtual base offsets may be stored in class tables, frequently as special entries in the VTBL. This variant, although more space efficient in the case of many objects instantiated from the same class, doubles the time penalty since each access to members of the virtual base must pass through two levels of indirection instead of one.

It turns out that for any given class, the number of VBPTRs stored in each object in one variant is exactly the same as the number of offsets stored in the class information in the other variant. Thus, to facilitate a clear understanding of the present invention as described hereinbelow, the following description will concentrate on the "time-efficient" variant in which pointers to virtual bases are stored in objects.

The number of VBPTRs is greater than what it might appear at first since these pointers cannot be shared across virtual inheritance. To illustrate why this is so, the reader is directed to FIG. 8, which is a diagram of a class hierarchy illustrating single virtual inheritance. Each instance of class $u_1$ has a virtual base pointer to the $v_1$ subobject. This is also the case for instances of class $v_2$. Now, since the inheritance link between $v_2$ and $u_1$ is nonvirtual, then the VBPTR to $v_1$ can be shared by $u_1$ and $v_2$. Also, each instance of class $u_2$ must store two pointers to both the $v_1$ and the $v_2$ subobjects which correspond to virtual bases. However, as depicted in FIG. 9, which is a diagram illustrating the memory layout of objects of class $u_2$ of FIG. 8, the pointer to the $v_1$ base is duplicated in a $u_2$ instance. That is, there is one such pointer in the memory area allocated for $u_2$'s own data, but also another such pointer stored in the $v_2$ subobject of $u_2$.

Let us make the distinction between "essential" and "inessential" VBPTRs. The essential VBPTRs are precisely the minimal set of VBPTRs which allows direct or indirect access to every virtual subobject from any of its containing subobjects. Inessential VBPTRs are those which can be computed from the essential ones, but are stored to ensure that an upcast to an indirect virtual base takes no more time than an upcast to a direct virtual base, thus guaranteeing constant access to all data members and all virtual functions. More generally, in the traditional object layout scheme, there is no sharing across virtual inheritance links of any compiler-generated field, including VPTRs and other fields used for realizing run-time type information. Therefore, inessential VBPTRs are introduced because essential VBPTRs are not shared across virtual inheritance links.

Alternatively, to reduce space overhead in objects, inessential VBPTRs could be eliminated. This translates, in our example, to having only one VPTR to $v_1$ that would be stored in the $v_2$ subobject of $u_2$. This more space efficient variant increases the time to access a virtual base subobject when a chain of VBPTRs has to be followed. In our example, if inessential. VBPTRs are eliminated, accessing the $v_1$ subobject from the $u_2$ object requires two levels of indirection instead of one.

FIG. 10 is a diagram of an n-chain virtual inheritance class hierarchy. As shown therein, each instance of the bottom most class in a virtual inheritance chain of n classes must include $n(n-1)/2$ VBPTRs in total. The situation is no different if virtual bases are stored with class information, except that the overhead is not repeated per object. The number of offsets that must be stored in total for all classes is $(n^3-n)/6$, i.e., cubic in the number of classes in the hierarchy!

Thus, in sum, the feature of multiple inheritance in object-oriented programming languages causes a significant space and time overhead for its implementation. Accordingly, it would be desirable and highly advantageous to have methods for reducing the space and time overhead associated with implementing multiple inheritance.

SUMMARY OF THE INVENTION

The present invention is directed to methods for implementing virtual bases with fixed offsets in object oriented applications.

In a first aspect of the invention, there is provided a method for implementing virtual bases with fixed offsets in a class hierarchy graph corresponding to an object oriented program. The graph has nodes representing object classes and edges representing immediate inheritance therebetween. The method includes the step of determining whether a set N is empty, the set N including all nodes in the graph. A node x is removed from the set N, when the set N is not empty. It is determined whether a set Y is empty, the set Y including nodes that directly and virtually inherit from the node x. A return is made to the step of determining whether the set N is empty, when the set Y is empty. A node y is removed from the set Y, when the set Y is not empty. It is determined whether the node y is duplicated in the graph. A return is made to the step of determining whether the set Y is empty, when the node y is duplicated. An edge e is replaced with an edge e', when the node y is not duplicated. The edge e represents that the node y virtually inherits from the node x. The edge e' represents that the node x has a fixed offset with respect to the node y. In a second aspect of the invention, a return is made to the step of determining whether the set N is empty, upon replacing the edge e.

In a third aspect of the present invention, there is provided a method for implementing virtual bases with fixed offsets in a class hierarchy graph corresponding to an object oriented program. The graph has nodes representing object classes and edges representing immediate inheritance therebetween. The method includes the step of determining whether a set V' is empty, the set V' including nodes that directly and virtually inherit from a node v in the graph. A node u is removed from the set V', when the set V' is not empty. It is determined whether the node u is duplicated in the graph. The node u is added to a set V, when the node u is not duplicated, the set V initially comprising an empty set of nodes that directly and virtually inherit from the node v and that are not duplicated. A return is made to the step of determining whether the set V' is empty, upon one of adding the node u and when the node u is duplicated. It is determined whether the set V is empty. A subset S of the set V is selected such that the subset S is a maximal independent set in a set G, when the set V is not empty. The set G includes a first ordered pair of the set V and a set E. The set E includes a second ordered pair of a node u1 and a node u2. The nodes u1 and u2 are included in the set V and have a common descendant in the graph. It is determined whether the subset S is empty. A node s is removed from the subset S, when the subset S is not empty. An edge e is replaced with an edge e'. The edge e represents that the node s virtually inherits from the node v. The edge e' represents that the node v has a fixed offset with respect to the node s. In a fourth aspect of the present invention, a return is made to the step of determining whether the set S is empty, upon replacing the edge e.

These and other aspects, features and advantages of the present invention will become apparent from the following detailed description of preferred embodiments, which is to be read in connection with the accompanying drawings.

BRIEF DESCRIPTION OF THE DRAWING

FIG. 34 is a flow chart of a method for laying out a subobject u in an object layout chart corresponding to an object class according to an embodiment of the present invention;

FIG. 35 is a flow chart of a method for laying out a subobject u in an object layout chart corresponding to an object class according to another embodiment of the present invention;

DETAILED DESCRIPTION OF PREFERRED EMBODIMENTS

Figure 1:
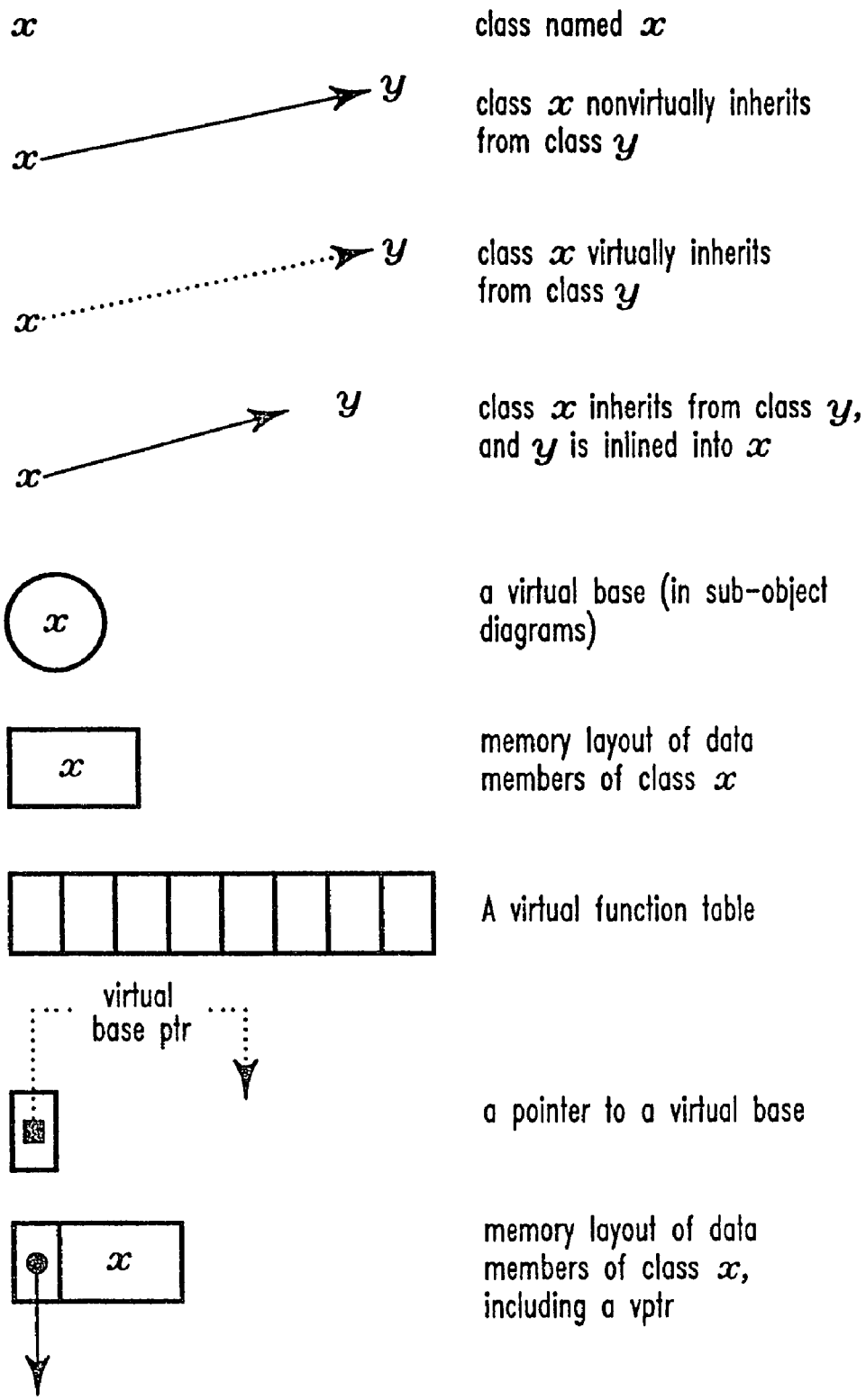
FIG. 1 is diagram illustrating the various graphical notations used herein with respect inheritance hierarchies, object layout diagrams and subobject graphs.
Figure 2:
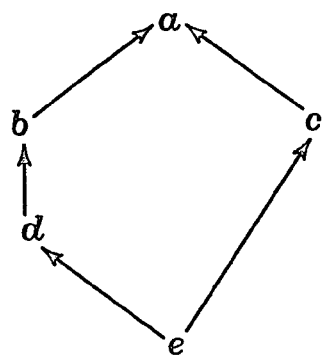
FIG. 2 is a diagram of a class hierarchy illustrating repeated inheritance.
Figure 3:
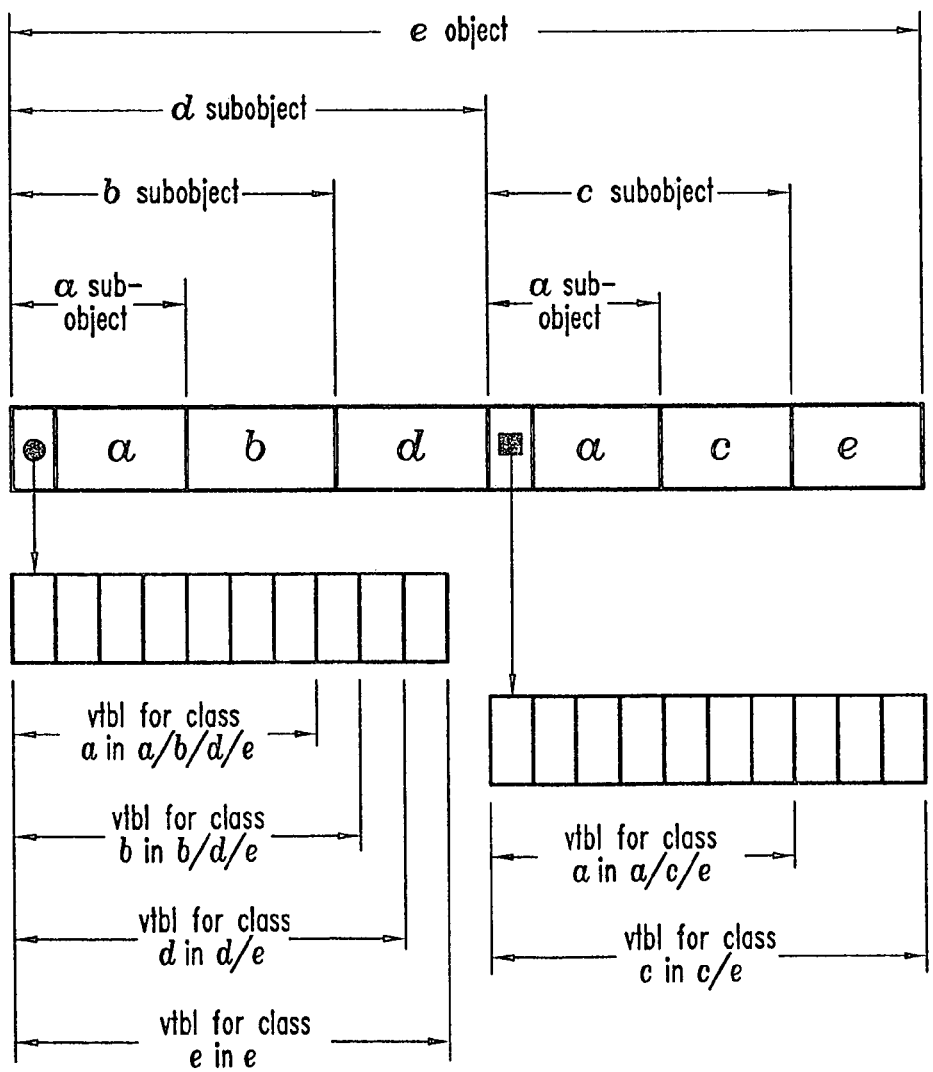
FIG. 3 is a diagram illustrating the traditional layout of objects of class e of the hierarchy of FIG. 2.
Figure 4:
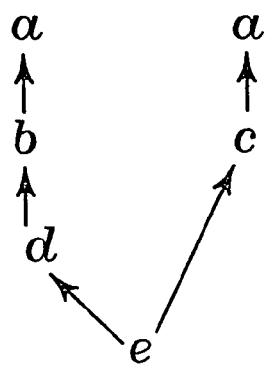
FIG. 4 is a subobject graph of a class e of FIG. 2.

The present invention is directed to methods for implementing virtual bases with fixed offsets in object oriented applications. The present invention allows shared inheritance (i.e., when a base class inherited along distinct paths occurs only once in the derived class) to be loosely coupled with its implementation, permitting the compiler to choose between a number of different strategies for the implementation of shared inheritance so as to minimize the space and time penalties.

Any language that efficiently implements multiple inheritance must deal with the issues of time and space overhead. Thus, while examples are provided herein corresponding to the C++ programming language so as to facilitate a clear understanding of the present invention, the benefits of the present invention apply to any other statically typed class-based language. This includes, for example, Eiffel, even though the semantics of multiple inheritance in Eiffel is even richer than that of C++. The impact of the techniques of the present invention is even greater if all inheritance is shared (as it is with languages such as Theta and Simula). Eiffel is described by B. Meyer, in Object-Oriented Software Construction, Prentice-Hall, second edition, 1997. Theta is described by A. C. Myers, in "Bidirectional Object Layout for Separate Compilation", Proceedings of the 10$^{th}$ Annual Conference on Object-Oriented Programming Systems, Languages, and Applications (OOP-SLA'95), pp. 124-139, Austin, Tex., USA, Oct. 15-19 1995 (also published in ACM SIGPLAN Notices 30(10), October 1995). Simula is described by S. Krogdahl, in "Multiple Inheritance in Simula-Like Languages", BIT, 25:318-326, 1984.

Since the methods of the present invention may be utilized in the back-end of a compiler, they are applicable to other semantic models in which several implementations are to be amalgamated. An implementation of mixins (a form a multiple inheritance wherein a class can derive from multiple base classes) in a statically typed programming language, such as Beta, constitutes a perfect case in point. Beta is described by E. Ernst, in "Propagating mixins", which is to appear in the Proceedings of the 13$^{th}$ European Conference on Object-Oriented Programming (ECOOP'99), Lecture-Notes in Computer Science, Lisbon, Portugal, June 1999, R. Guerraoui, ed., Springer Verlag.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 11:
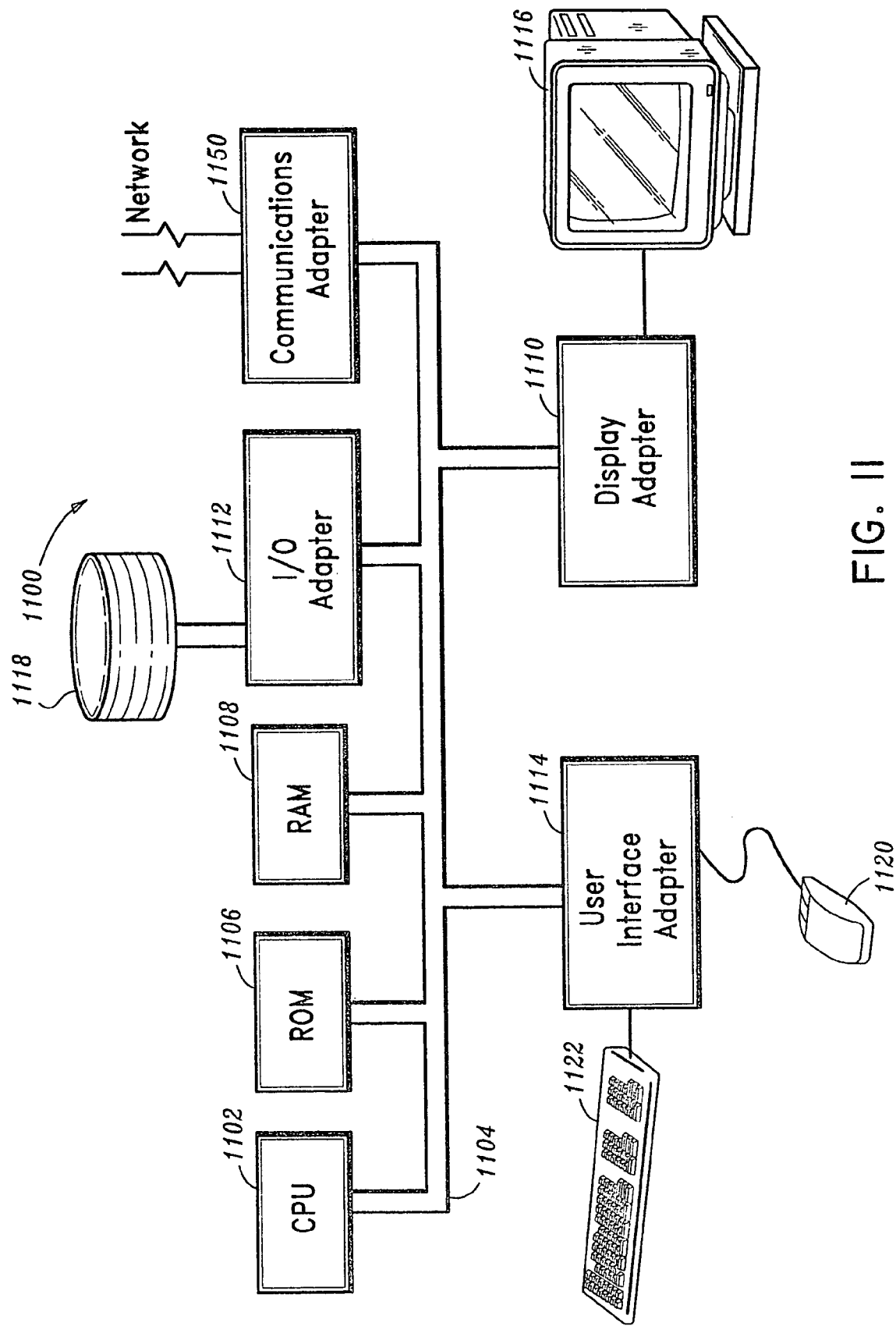
FIG. 11 is a block diagram of a computer processing system to which the present invention may be applied according to an embodiment of the present invention.

FIG. 11 is a block diagram of a computer processing system 1100 to which the present invention may be applied according to an embodiment of the present invention. The computer processing system 1100 includes at least one processor (CPU) 1102 operatively coupled to other components via a system bus 1104. A read only memory (ROM) 1106, a random access memory (RAM) 1108, a display adapter 1110, an I/O adapter 1112, and a user interface adapter 1114 are operatively coupled to the system bus 1104.

A display device 1116 is operatively coupled to the system bus 1104 by the display adapter 1110. A disk storage device (e.g., a magnetic or optical disk storage device) 1118 is operatively couple to the system bus 1104 by the I/O adapter 1112.

A mouse 1120 and keyboard 1122 are operatively coupled to the system bus 1104 by the user interface adapter 1114. The mouse 1120 and keyboard 1122 may be used to input/output information to/from the computer processing system 1100. A communications adapter 1150 is operatively coupled to bus 1104 so as to operatively connect system 1100 to a network.

A description of streamlining virtual inheritance according to the present invention will now be given. Streamlining virtual inheritance consists of three class hierarchy transformations. The first transformation is the elimination of transitive virtual inheritance edges. This transformation brings the hierarchy into a more canonical form, making it easier to apply the two subsequent transformations which are space optimization techniques.

In the second transformation, we devirtualize those virtual inheritance edges which are not used for designating sharing. In the third transformation, we identify some of the cases where virtual inheritance can be implemented with a fixed offset.

Although each transformation can be applied to an inheritance hierarchy on its own, the order we chose is the one which maximizes their combined benefit. However, the order described herein may be rearranged, while still maintaining the overall benefits of the present invention.

The first two transformations have been discussed separately in the literature. We bring these two into synergy here with the inlining method of the present invention, while correcting and generalizing a previously published method for devirtualization. The complexity analysis of the following procedures are in terms of the class hierarchy graph.

A description of the method for eliminating transitive virtual inheritance edges will now be given. This transformation simplifies the class hierarchy. This transformation should, but not must, be applied prior to any optimization techniques.

Suppose that class $y<_v x$ and $z<y$. Then, the transitive virtual inheritance edge $(z<_v x)$ overspecifies that x is a virtual base of z. In laying out z, it is immaterial whether x is a direct or an indirect virtual base of z, and therefore we can eliminate the transitive edge $(z <_v x)$. This phenomena was first observed by F. Tip and P. Sweeney in "Class hierarchy Specialization", Proceedings of the Twelfth Annual Conference on Object-Oriented Programming Systems, Languages, and Applications (OOP-SLA'97), Atlanta, Ga., pp. 271-285, October 1997 (also published as ACM SIGPLAN Notices 32(10), 1997). The authors thereof also showed how to remove transitive virtual inheritance edges. The following procedure "eliminate-transitive-virtual-edges" illustrates how this is done.

| | |
|---|---|
| [1] | Procedure eliminate-transitive-edges (Hierarchy H) |
| [2] | Begin |
| [3] | For each node $\chi \in$ H do |
| [4] | Let S = $\{y|y<_v \chi\}$ |
| [5] | For each y, z $\in$ S do |
| [6] | If z < y then |
| [7] | H ←H - $\langle z <_v \chi \rangle$ |
| [8] | fi |
| [9] | od |
| [10] | od |
| [11] | end |

Figure 12:
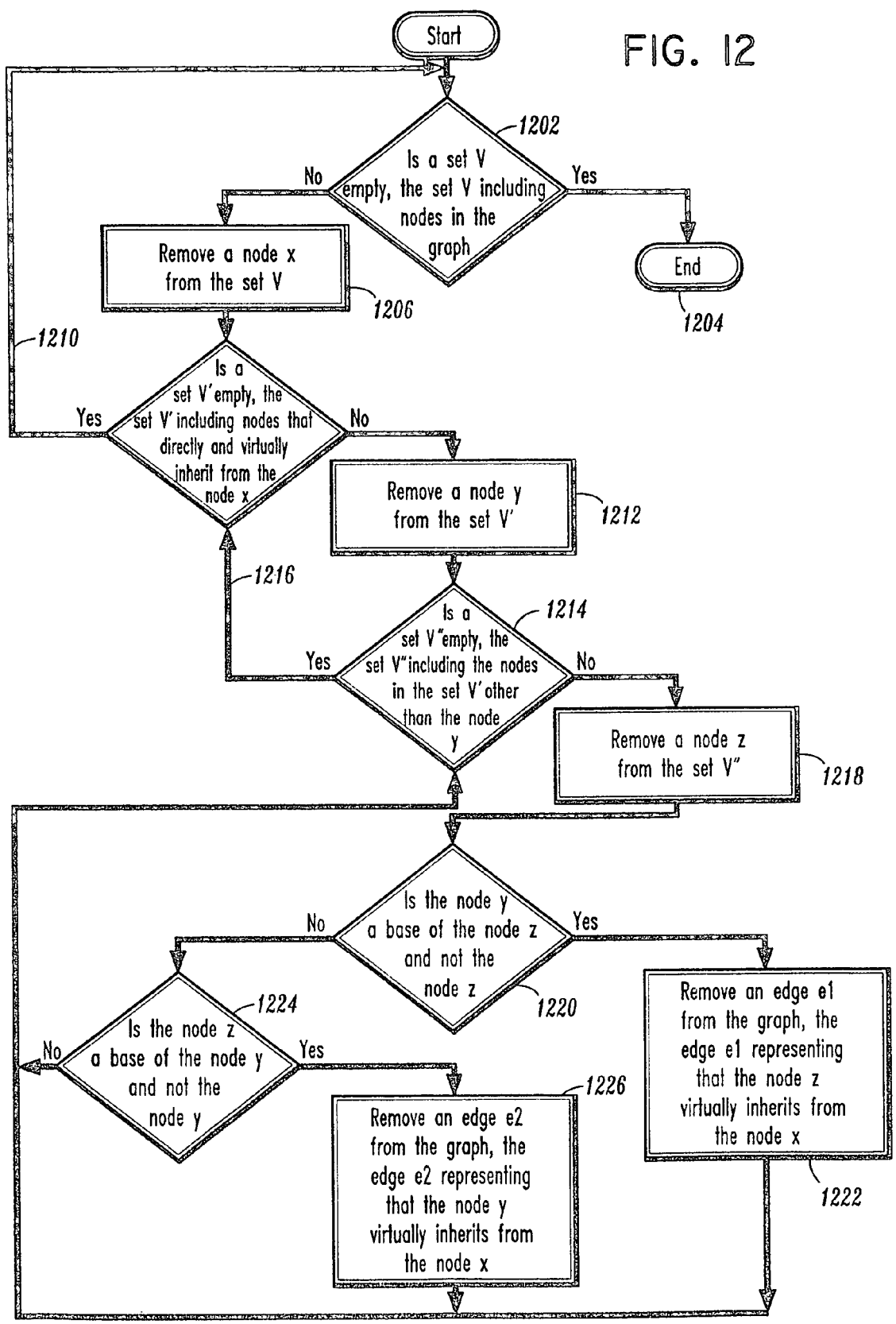
FIG. 12 is a flow chart of a method for eliminating transitive edges in a class hierarchy graph corresponding to an object oriented program.

FIG. 12 is a flow chart of a method for eliminating transitive edges in a class hierarchy graph corresponding to an object oriented program. The graph has nodes representing object classes and edges representing immediate inheritance therebetween.

It is determined if a set V is empty, the set V including the nodes in the graph (step 1202). If the set V is empty, then the method is terminated (step 1204). On the other hand, if the set V is not empty, then a node x is removed from the set V (step 1206).

It is then determined if a set V' is empty, the set V' including nodes that directly and virtually inherit from the node x (step 1208). If the set V' is empty, then a return is made to the step of determining if the set V is empty (i.e., step 1202) (step 1210). On the other hand, if the set V' is not empty, then a node y is removed from the set V' (step 1212).

It is then determined if a set V" is empty, the set V" including the nodes in the set V' other than the node y (step 1214). If the set V" is empty, then a return is made to the step of determining if the set V' is empty (step 1216). On the other hand, if the set V" is not empty, then a node z is removed from the set V" (step 1218).

It is then determined if the node y is a base of the node z and not the node z (step 1220). If the node y is a base of the node z and not the node z, then an edge e1 is removed from the graph (step 1222). The edge e1 represents that the node z virtually inherits from the node x.

On the other hand, if the node y is not a base of the node z or is the node z, then it is determined if the node z is a base of the node y and not the node y (step 1224). If the node z is a base of the node y and not the node y, then an edge e2 is removed from the graph (step 1226). The edge e2 represents that the node y virtually inherits from the node x. A return is made to the step of determining if the set V" is empty (i.e., step 1214), upon one of removing the edge e1 (i.e., step 1222), removing the edge e2 (i.e., step 1226), and when the node z is not a base of the node y (as determined at step 1224).

Figure 13A:
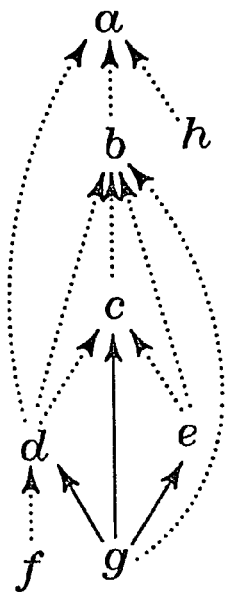
FIG. 13(a) is a diagram of a class hierarchy.
Figure 13B:
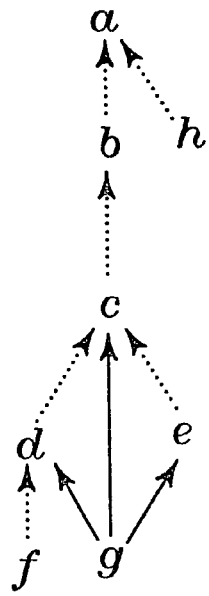
FIG. 13(b) is a diagram of the class hierarchy of FIG. 13(a) after elimination of transitive virtual inheritance edges.
Figure 13C:
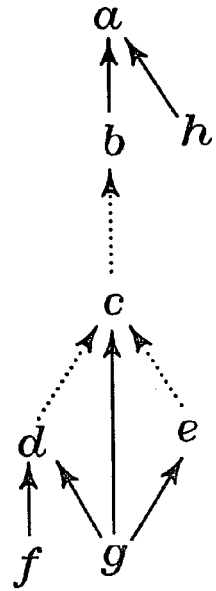
FIG. 13(c) is a diagram of the class hierarchy of FIG. 13(a) after elimination of single virtual inheritance.

FIG. 13(a) is a diagram of a class hierarchy. FIG. 13(b) is a diagram of the class hierarchy of FIG. 13(a) after elimination of transitive virtual inheritance edges. FIG. 13(c) is a diagram of the class hierarchy of FIG. 13(a) after elimination of single virtual inheritance as described hereinbelow. Consider the class hierarchy of FIG. 13(a). Then, the application of the above procedure eliminate-transitive-edges will result in the hierarchy of FIG. 13(b), where the following edges have been removed: $(d<_v a)$, $(d<_v b)$, $(e<_v b)$, and $(g<_v b)$. Clearly, global program information is a prerequisite of eliminate-transitive-edges.

It should be stressed that eliminate-transitive-edges is merely a graph transformation technique, and not a C++ semantic preserving source-to-source transformation. There are rather subtle semantic differences at the source level between FIG. 13(a) and FIG. 13(b). For example, if a class x virtually inherits from a base class along two paths, one of which is protected and the other is private, then eliminating the protected virtual inheritance path will change the semantics of x. Therefore, this transformation needs to be done after static semantic checking. Conversely, the same example demonstrates a rationale for a program to use transitive inheritance edges.

A description of edge devirtualization will now be given. Edge devirtualization, which is the next step in the streamlining of virtual inheritance, corresponds to devitalizing those virtual edges in a hierarchy which do not represent shared inheritance. This semantic preserving transformation is our first space optimization technique. Devirtualizing an edge allows VBPTRs to be eliminated, and it opens opportunities for sharing compiler-generated fields.

Figure 14:
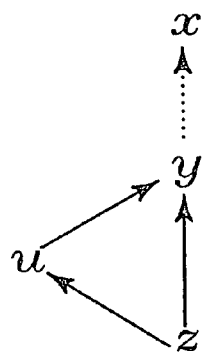
FIG. 14 is a diagram of an example hierarchy in which a single incoming virtual edge which should not be devirtualized.

As a simple example, consider a hierarchy with two classes, x and y, where y virtually inherits from x. Then, the edge $(y<_v x)$, can be devirtualized by replacing it with the edge $(y<_r x)$. Devirtualization was first proposed by D. Bacon, in "Fast and Effective Optimization of Statically Typed Object-Oriented Languages", PhD Thesis, U. of Cal. at Berkeley, December 1997. However, determining when it is legitimate is quite an elusive prospect. For example, $(y<_v x)$ must not be devirtualized if two more classes were to be added to our example, to form the hierarchy shown in FIG. 14. FIG. 14 is a diagram of an example hierarchy in which a single incoming virtual edge which should not be devirtualized. The reason is that there are two subobjects of type y in a z object, and devirtualizing $(y<_v x)$ would also imply two x subobjects in z, which violates virtual inheritance semantics. Indeed, this is a case where the above referenced devirtualization algorithm of D. Bacon fails.

Thus, in contrast to prior belief, a virtual base with a single incoming edge cannot be devirtualized without a global examination of the inheritance hierarchy. Specifically, edge $(y<_v x)$ cannot be devirtualized if y is "duplicated". Duplication is a global property as shown by the following definition (hereinafter referred to as "definition 1"): a class y is duplicated in a hierarchy H if there are multiple occurrences of y in the subobject graph of some class z of H.

There are multiple occurrences of y in z if, for example, z repeatedly inherits from y "more than once", or if z inherits from y in both a repeated and shared manner. Also, y is duplicated if there is yet another duplicated class u which non-virtually and directly inherits from y. The following procedure (hereinafter referred to as "is-duplicated") is used to determine whether duplication exists according to definition 1 above.

| [1] | Function is-duplicated (Node y): Boolean |
|---|---|
| [2] | Begin |
| [3] | For each u $\prec_r$ y do |
| [4] | If is-duplicated(u) then |
| [5] | Return true |
| [6] | fi |
| [7] | For each v$\prec$ y,v $\neq$ u do |
| [8] | If HCD (u,v) then |
| [9] | Return true |
| [10] | fi |
| [11] | od |
| [12] | od |
| [13] | Return false |
| [14] | end |

Figure 15:
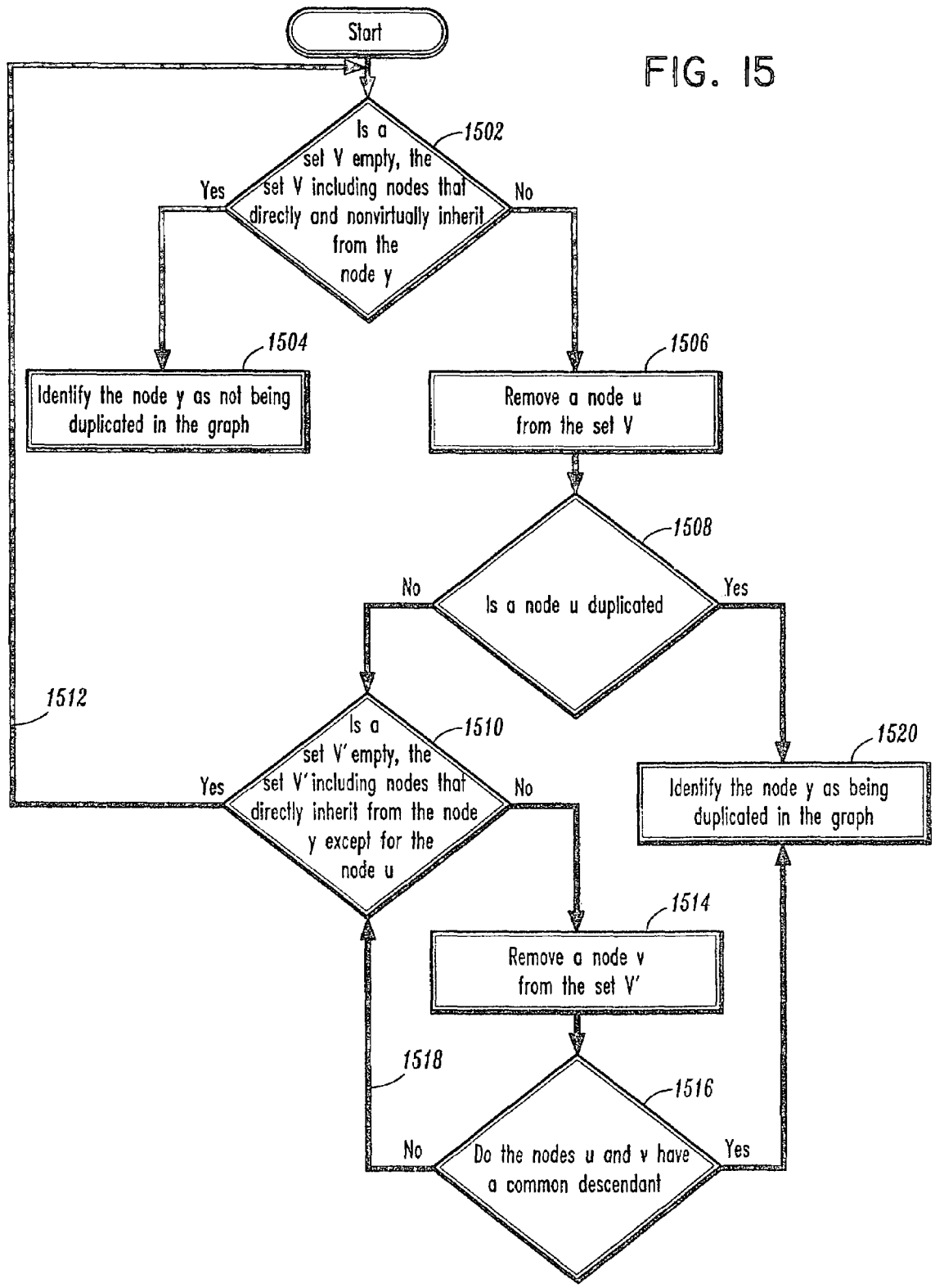
FIG. 15 is a flow chart of a method for determining whether a node y is duplicated in a class hierarchy graph corresponding to an object oriented program.

FIG. 15 is a flow chart of a method for determining whether a node y is duplicated in a class hierarchy graph corresponding to an object oriented program. The graph has nodes representing object classes and edges representing immediate inheritance therebetween.

It is determined if a set V is empty, the set V comprising all the nodes that nonvirtually inherit from the node y (step 1502). If the set V is empty, then the node y is identified as not being duplicated in the graph (step 1504).

On the other hand, if the set V is not empty, then a node u is removed from the set V (step 1506), and it is determined if the node u is duplicated in the graph (step 1508). If the node u is not duplicated, then it is determined if a set V' is empty (step 1510). The set V'includes all the nodes that directly inherit from the node y except for the node u.

If the set V' is empty, then a return is made to the step of determining if the set V is empty (i.e., step 1502) (step 1512). On the other hand, if the set V' is not empty, then a node v is removed from the set V' (step 1514).

It is then determined if the node u and the node v have a common descendant (step 1516). If the node u and the node v do not have a common descendant, then a return is made to the step of determining if the set V' is empty (i.e., 1510) (step 1518).

If the node u is duplicated (as determined at step 1508) or the node u and the node v have a common descendant (as determined at step 1516), then the node y is identified as duplicated (step 1520).

The following procedure (hereinafter referred to as "HCD") is used to determine whether two classes have a common descendant.

| [1] | Function HCD (Node $v_1$, $v_2$): Boolean |
|---|---|
| [2] | Begin |
| [3] | For each w $\epsilon$ H do |
| [4] | If W $\leq$ $v_1$, W $\leq$ $v_2$, |
| [5] | Return true |
| [6] | fi |
| [7] | od |
| [8] | Return false |
| [9] | end |

Figure 16:
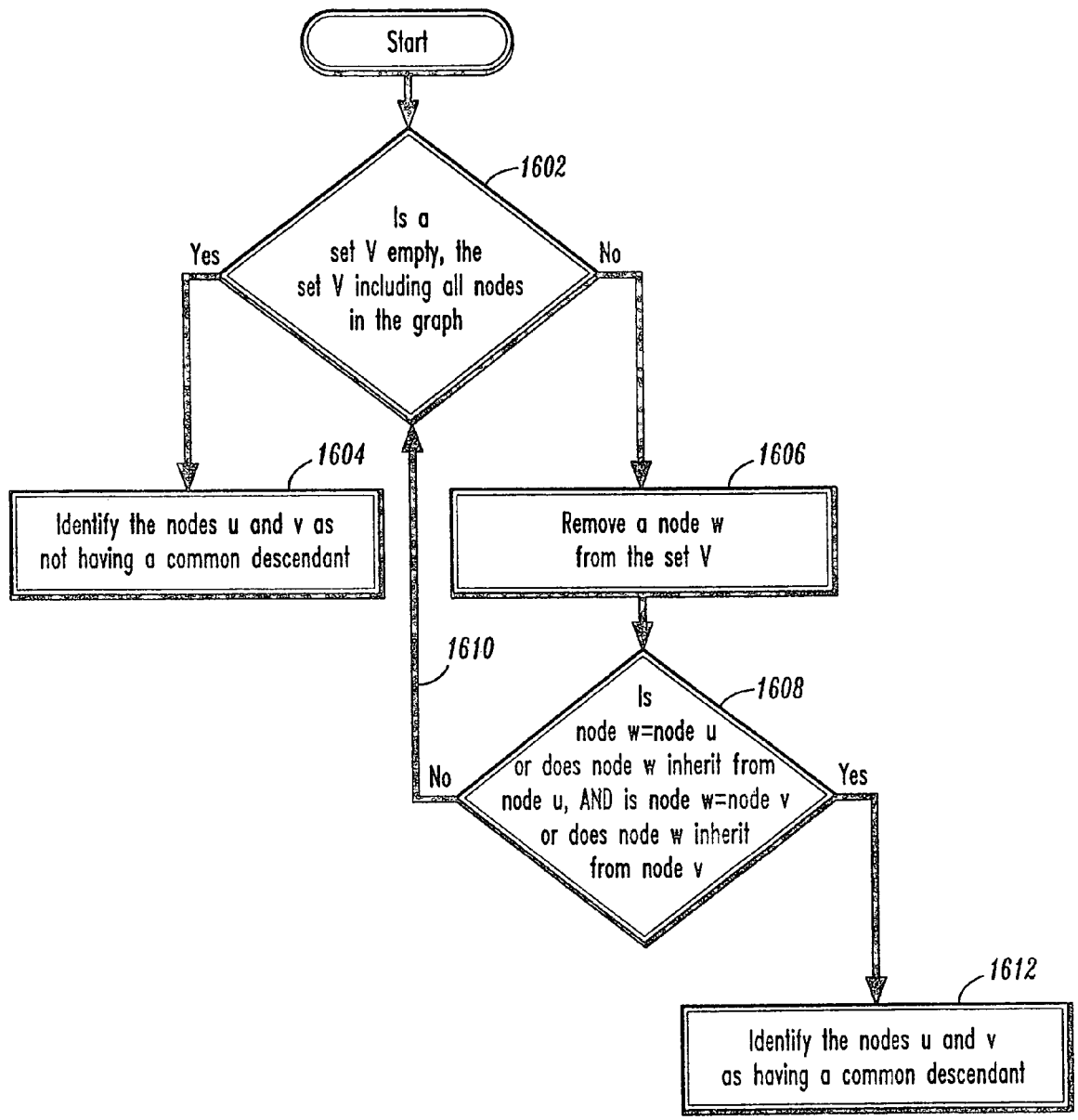
FIG. 16 is a flow chart of a method for determining whether two nodes u and v have a common descendant in a class hierarchy graph corresponding to an object oriented program.

FIG. 16 is a flow chart of a method for determining whether two nodes u and v have a common descendant in a class hierarchy graph corresponding to an object oriented program. The graph has nodes representing object classes and edges representing immediate inheritance therebetween. The nodes u and v correspond to classes u and v, respectively.

It is determined if a set V is empty, the set V comprising all the nodes in the graph (step 1602). If the set V is empty, then the nodes u and v are identified as not having a common descendant in the graph (step 1604). On the other hand, if the set V is not empty, then a node w is removed from the set V (step 1606).

It is then determined if the node w is the node u or the node w inherits from the node u, and if the node w is the node v or the node w inherits from the node v (step 1608). If the node w is not the node u or the node w does not inherit from the node u, and the node w is not the node v or the node w does not inherit from the node v, then a return is made to the step of determining if the set V is empty (i.e., step 1602) (step 1610). On the other hand, if the node w is the node u or the node w inherits from the node u, and the node w is the node v or the node w inherits from the node v, then the nodes u and v are identified as having a common descendant (step 1612).

Devirtualization can still be done even if there are multiple incoming virtual edges into a virtual base x.

A single virtual inheritance edge is defined in the following definition (hereinafter referred to as "definition 2"): an edge (y<$_v$x) is considered a single virtual inheritance edge, if y is not duplicated and there is no other $y^1$=y, $y^{1<v}$ x, such that there is z, z<y and z<$y^1$.

Figure 17:
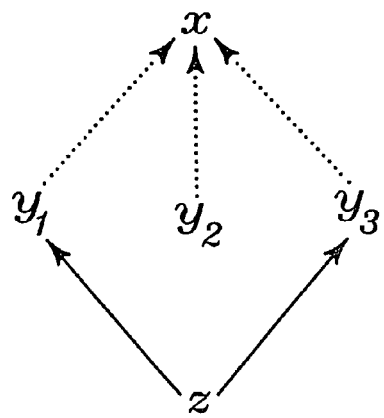
FIG. 17 is a diagram of multiple incoming virtual edges, some of which may be devirtualized.

For example, consider the example of FIG. 17, which is a diagram of multiple incoming virtual edges, some of which may be devirtualized. In FIG. 17, ($y_2$<$_v$x) is the only single virtual inheritance edge. A single virtual inheritance edge (y<$_v$x) can be safely devirtualized since it's devirtualization preserves the semantics of virtual inheritance.

For example, class a in FIG. 13(*b*) has two incoming virtual edges: (b<$_v$a) and (h<$_v$a). Since there are no common descendants to the nonduplicated nodes b and h, both these edges represent single virtual inheritance, and can be devirtualized. Conversely, there are two incoming virtual edges (d<$_v$c) and (e<$_v$c) into class c. However, singe g is a common ancestor of d and e, these edges are not a case of single virtual inheritance.

The following procedure (hereinafter referred to as"eliminate-single-VI") is used to devirtualize all single virtual inheritance edges. This procedure improves on the result of D. Bacon, described in above referenced article "Fast and Effective Optimization of Statically Typed Object-Oriented Languages", by considering multiple incoming virtual inheritance edges.

| [1] | Procedure eliminate-single-VI (Hierarchy H) |
|---|---|
| [2] | Begin |
| [3] | For each node x $\epsilon$ H do |
| [4] | Let S = {y\|y $\prec_v$ x $\wedge \neg$is-duplicated(y)} |
| [5] | For each y $\epsilon$ S do |
| [6] | For each $y^1$ $\epsilon$ S, $y^1$ $\neq$ y do |
| [7] | If HCD (y, $y^1$) then |
| | HCD (y, $y^1$) has shared virtual inheritance with x via subobjects of type y and $y^1$ |
| [8] | next y |
| [9] | fi |
| [10] | od |

-continued

Figure 18:
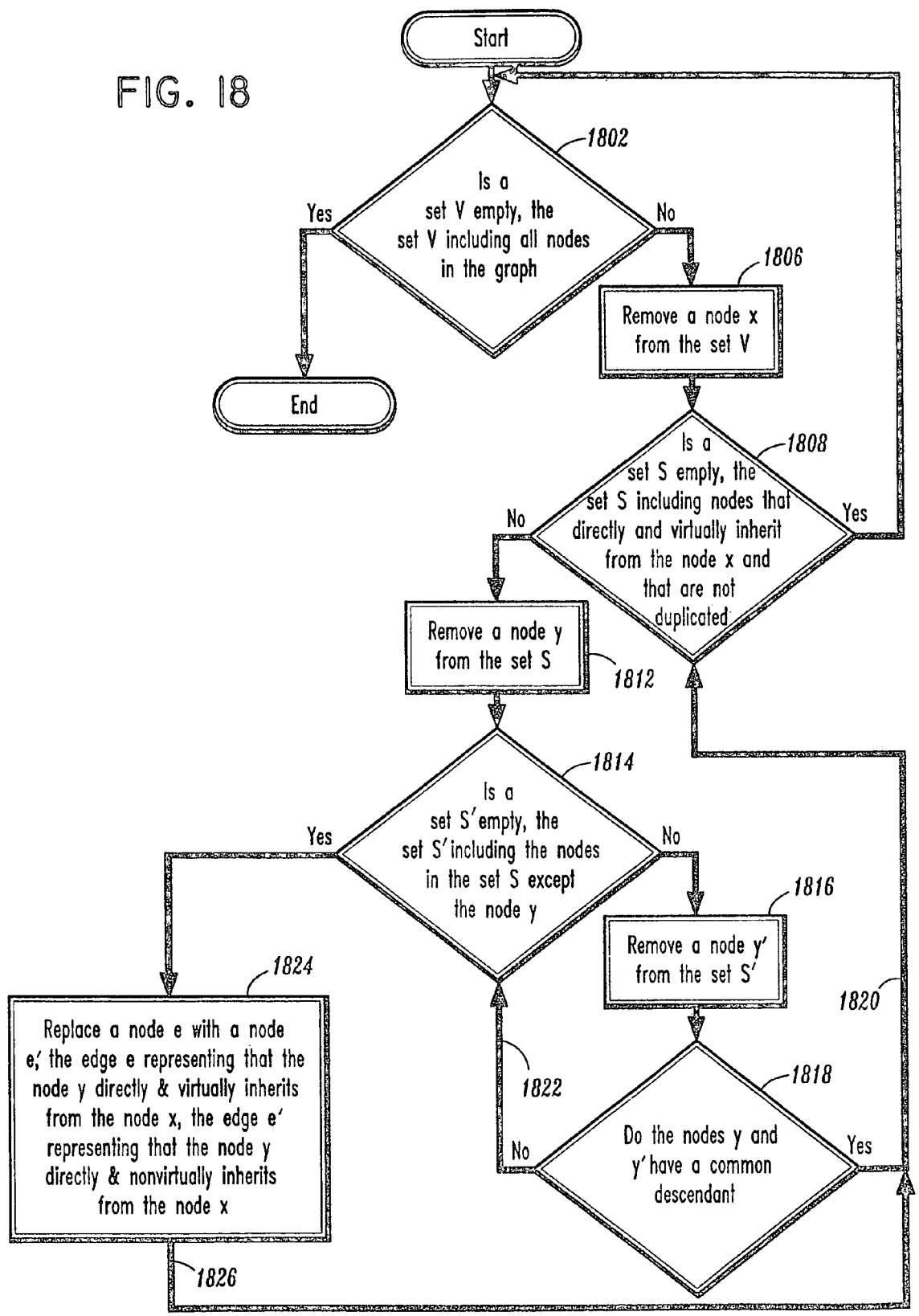
FIG. 18 is a flow chart of a method for devirtualizing single virtual inheritance edges in a class hierarchy graph corresponding to an object oriented program.

A single virtual inheritance between y and x was detected
[11]         H ←H − (y <$_v$ x)
[12]         H ←H + (y <$_r$ x)
[13]      od
[14]    od
[15]  end FIG. 18 is a flow chart of a method for devirtualizing single virtual inheritance edges in a class hierarchy graph corresponding to an object oriented program. The graph has nodes representing object classes and edges representing immediate inheritance therebetween.

It is determined if a set V is empty, the set V comprising all the nodes in the graph (step 1802). If the set V is empty, then the method terminates (step 1804). On the other hand, if the set V is not empty, then a node x is removed from the set V, (step 1806).

It is then determined if a set S is empty, the set S comprising all of the nodes in the graph that directly and virtually inherit from the node x and that are not duplicated in the graph (step 1808). If the set S is empty, then a return is made to the step of determining if the set V is empty (i.e., step 1802) (step 1810). On the other hand, if the set S is not empty, then a node y is removed from the set S (step 1812).

It is then determined if a set S' is empty, the set S' comprising the nodes in the set S except the node y (step 1814). If the set S' is not empty, then a node y' is removed from the set S' (step 1816), and it is then determined if the node y and the node y' have a common descendant (step 1818). If the nodes y and y' do not have a common descendant, then a return is made to the step of determining if the set S' is empty (i.e., step 1814) (step 1820). On the other hand, if the nodes y' and y' have a common descendant, then a return is made to the step of determining if the set S is empty (i.e., step 1808). (step 1822).

If the set S' is determined to be empty at step 1814, then an edge e is replaced with an edge e' (step 1824) The edge e represents that the node y directly and virtually inherits from the node x, and the edge e' represents that the node y has a fixed offset with respect to the node x. Upon replacing the edge e, a return is made to the step of determining if the set S is empty (i.e., step 1808) (step 1826).

Figure 19:
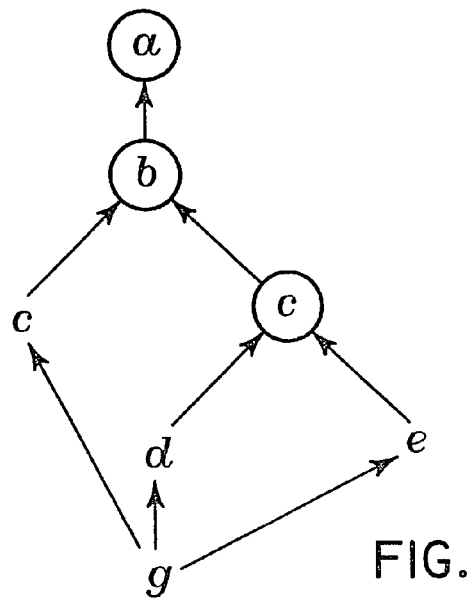
FIG. 19 is a diagram of the subobject graph of class g in FIG. 13(b)
Figure 20:
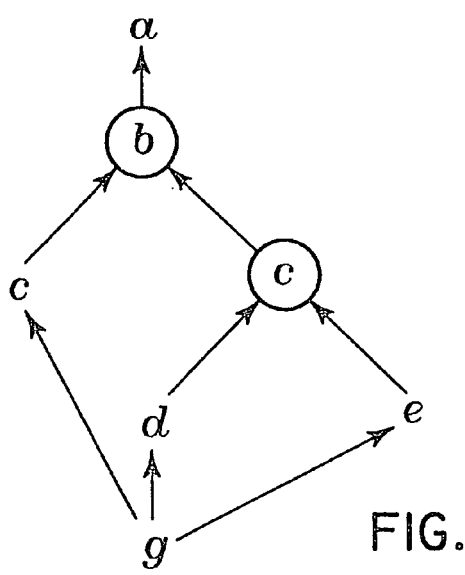
FIG. 20 is a diagram of the subobject graph of class g in FIG. 13(c)

When procedure eliminate-single-VI is applied to FIG. 13(*b*), edges (b<$_v$a), (h<$_v$a), and (f<$_v$d) are devirtualized resulting in the hierarchy of FIG. 13(*c*). Consider the subobject graph in FIG. 19, which is a diagram of the subobject graph of class g in FIG. 13(*a*). There are 6 VPTRs and 10 VBPTRs. After eliminate-single-VI has been applied, the number of VPTRs is reduced by one (to 5) and the number of VBPTRs is reduced by four (to 6),. FIG. 20 is a diagram of the subobject graph of class g in FIG. 13(*c*). In particular, FIG. 20 corresponds to the subobject graph for class g after eliminate-single-VI has been applied to FIG. 13(*b*).

Figures 9, 10:
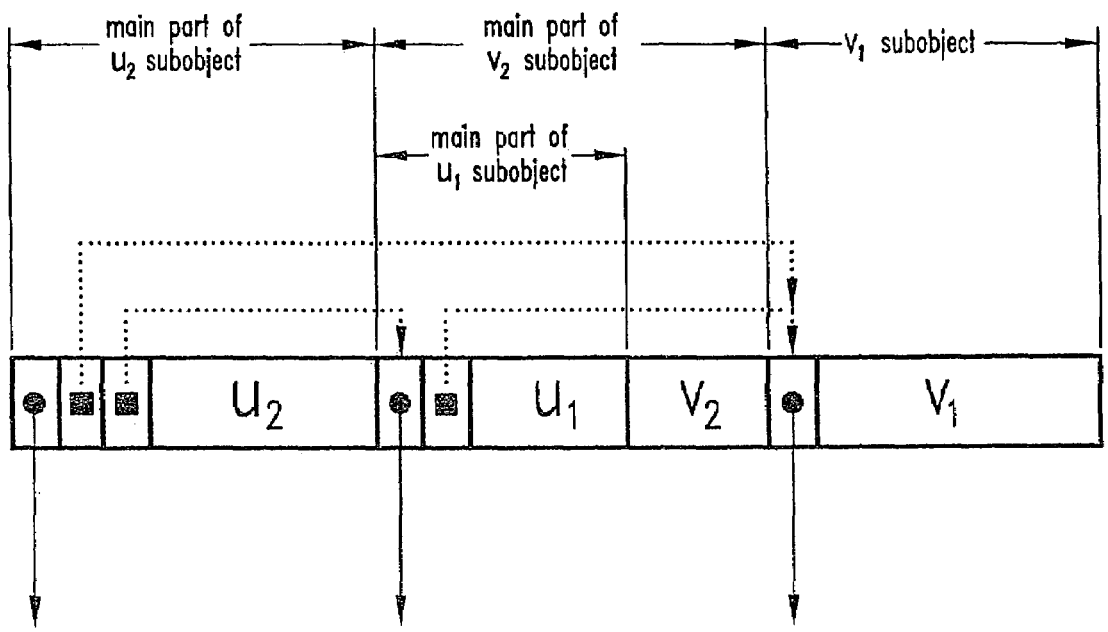
FIG. 9 is a diagram illustrating the memory layout of objects of class $u_2$ of FIG. 8.
FIG. 10 is a diagram of an n-chain virtual inheritance class hierarchy.

Recall the chain of n classes that was presented in FIG. 10. Initially, an object of class a$_1$ required n VPTRs and a quadratic number of VBPTRs. After applying eliminate-single-VI to this chain all inheritance is devirtualized, and an object of class a$_n$ requires only one VPTR and no VBPTRs.

The size of a y object may be reduced in a number of different ways due to the devirtualizing of an edge (y<$_v$x). First, the essential VBPTR from y to x is always eliminated. Second, the devirtualization enables sharing between x and y of compiler generated fields. These include one VPTR that may be shared between y and x. Even greater is the saving potential in the inessential VBPTRs from y to the virtual bases of x, which are all eliminated. There are up to n of these.

In addition, y's savings occurs every time y is a subobject in some object z. There could be an exponential number in n of y subobjects in an object z. Another kind of potential savings is the inessential VBPTRs to x in the subobjects derived from y. There are up to n possible classes that are derived from y. Each one of these classes has the potential to have exponential in n number of subobjects derived from y.

Figure 6:
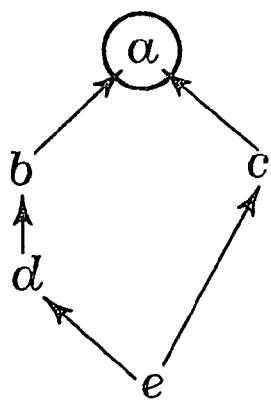
FIG. 6 is a subobject graph of class e of FIG. 5.
Figure 7:
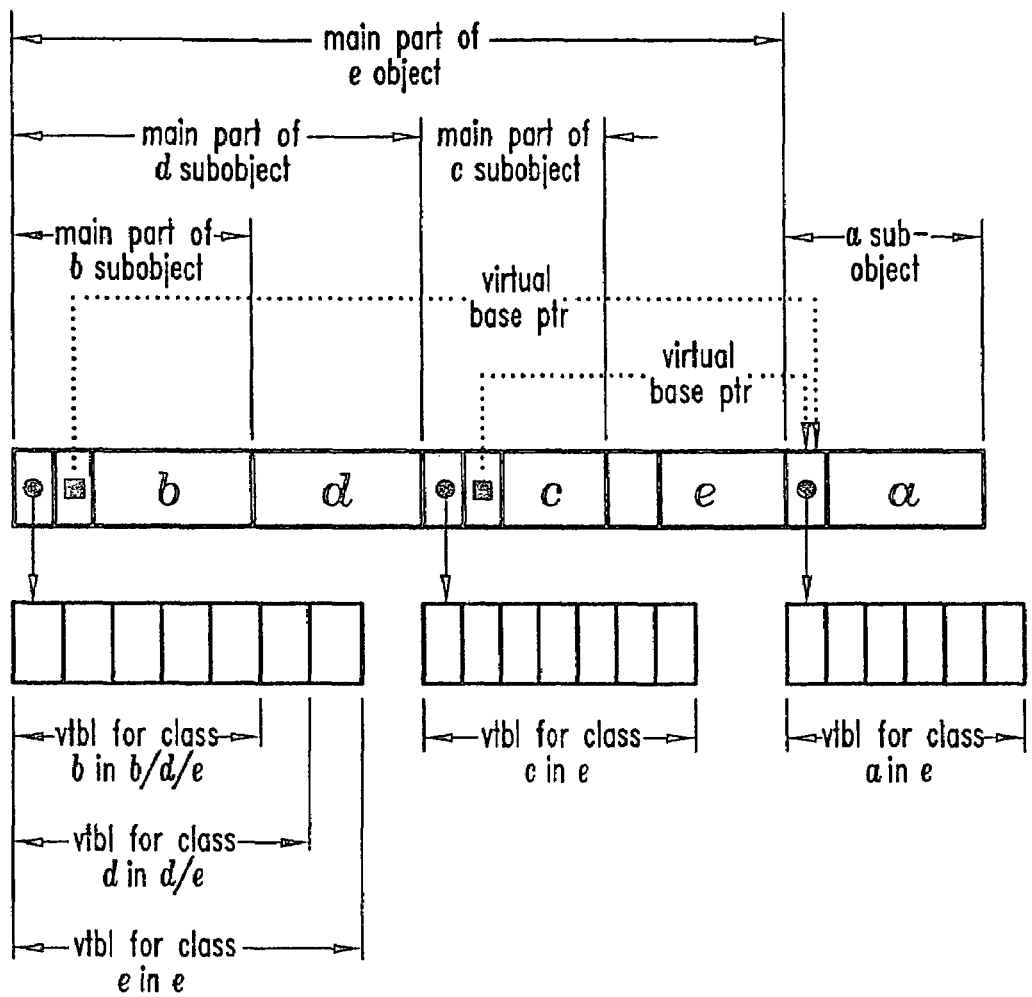
FIG. 7 is a diagram of the memory layout of objects of class e of FIG. 5.
Figure 8:
FIG. 8 is a diagram of a class hierarchy illustrating single virtual inheritance.
Figure 21:
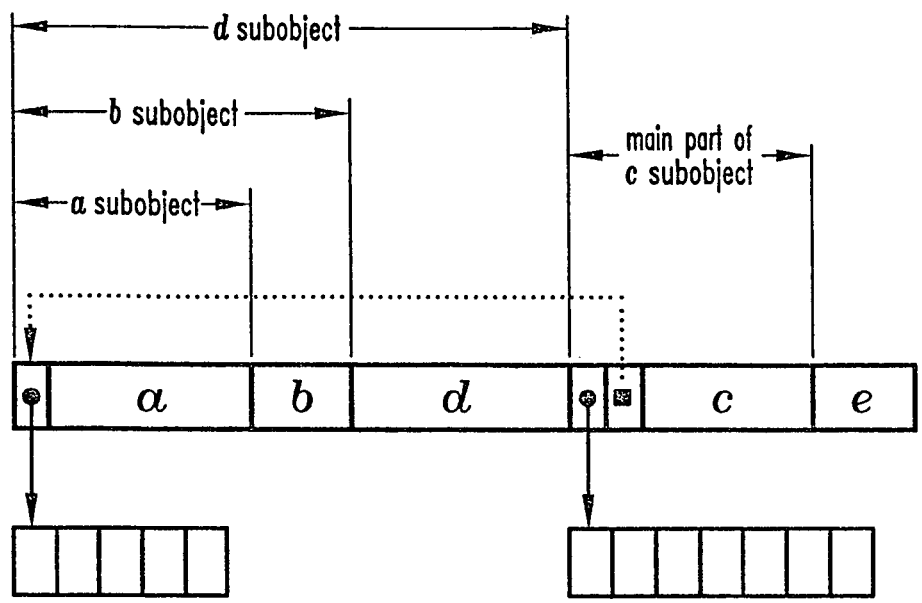
FIG. 21 is a diagram illustrating inlining a virtual base in the hierarchy of FIG. 5.

The final class hierarchy transformation, i.e, inlining virtual bases, will now be given. By inlining we mean that instead of storing a pointer to a virtual base subobject, this subobject can be stored in a fixed offset in the memory layout of the derived class. For an example, let's go back to the subobject graph of FIG. 6. Instead of laying out class e as in FIG. 7, inlining a into b obtains the layout shown in FIG. 21, which is a diagram illustrating inlining a virtual base in the hierarchy of FIG. 5. The new layout eliminates the VBPTR from b to a, and the separate VPTR for a.

Inlining is similar to devirtualization in that compiler-generated fields are eliminated since the offset of a virtual base is fixed with respect to a derived class. However, unlike devirtualization, an inlined base may still be shared. In particular, c's subobject in FIG. 21 still retains a VBPTR to a.

In addition to reducing space overhead, inlining reduces the time required to access a virtual base, b, and any of its members from the derived class that the base is inlined into since this derived class no longer uses a VBPTR to access b.

The potential savings associated with inlining include those of devirtualization. Furthermore, additional inessential VBPTRs may be eliminated. Suppose, for example, that inlining is applied to the hierarchy of FIG. 22, which is a diagram of an n-double-chain shaped virtual inheritance hierarchy. Assume that a$_i$ is inlined into a$_{i+1}$ and b$_i$ is inlined into b$_{i+1}$ for i=1, . . . , n−1. Clearly, a subobject of class a$_i$ (b$_i$) does not now need any VBPTRs to a$_j$ (b$_j$), j<i. Two VBPTRs, one from a$_2$ to b$_1$ and the other from b$_2$ to a$_1$, are sufficient for any a$_i$ (respectively b$_i$) to access any virtual base b$_j$ (respectively a$_j$) 0<j<i. This is because inlining makes the offsets of all b$_j$ (respectively a$_j$) subobjects fixed with respect to each other, and in particular, fixed with respect to b$_1$ (a$_1$). Therefore, the total number of VBPTRs in objects of class c is reduced from (n−1)(n−2) to 2, i.e., from quadratic to a constant.

Figure 22:
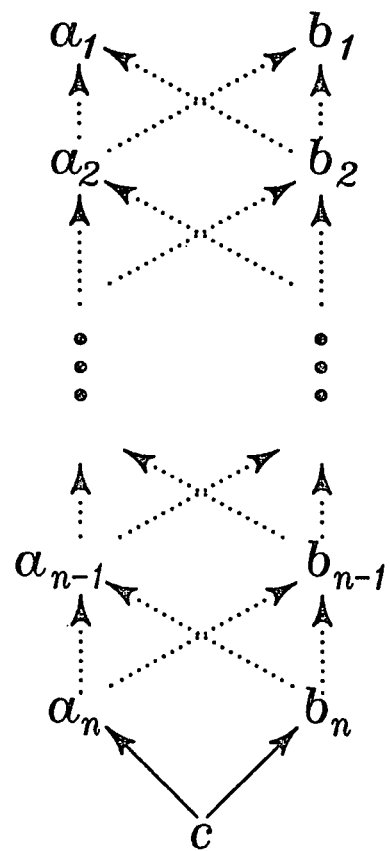
FIG. 22 is a diagram of an n-double-chain shaped virtual inheritance hierarchy.

Note that neither procedure eliminate-transitive-edges nor eliminate-single-VI can eliminate any virtual inheritance from the class hierarchy in FIG. 22, which is a diagram illustrating an n-double-chain shaped virtual inheritance hierarchy. That is, this class hierarchy has no transitive or single virtual inheritance edges.

As mentioned above, if x is a virtual base that has an immediate duplicated descendant y then x must not be inlined into y. This is because only one virtual base subobject of x occurs in the subobject graph while multiple subobjects of y occur. For example, consider the class hierarchy in FIG. 14. If x were inlined into y which is duplicated in z, then there would be two subobjects of type x in a z object, contradicting the semantics of virtual inheritance.

Hereinbelow, two methods are described which implement the inline virtual base transformation. The first method is based on the simple observation that a virtual base can be inlined into at least one of its immediate nonduplicated descendants. Assuming that procedures eliminate-transitive-virtual-edges and eliminate-single-VI were run, a simple procedure (hereinafter referred to as "simple-inline-VB") for selecting a derived class in which to inline a virtual base according to an embodiment of the present invention follows.

```
[1]    Procedure simple-inline-VB (Hierarchy H)
[2]    Begin
[3]        For each node x ∈ H do
[4]            If exists y ∈ H, y <_v x and ¬is-duplicated(y) then
[5]                H ←H − (y <_v x)
[6]                H ←H + (y <_i x)
[7]            od
[8]    end
```

Figure 23:
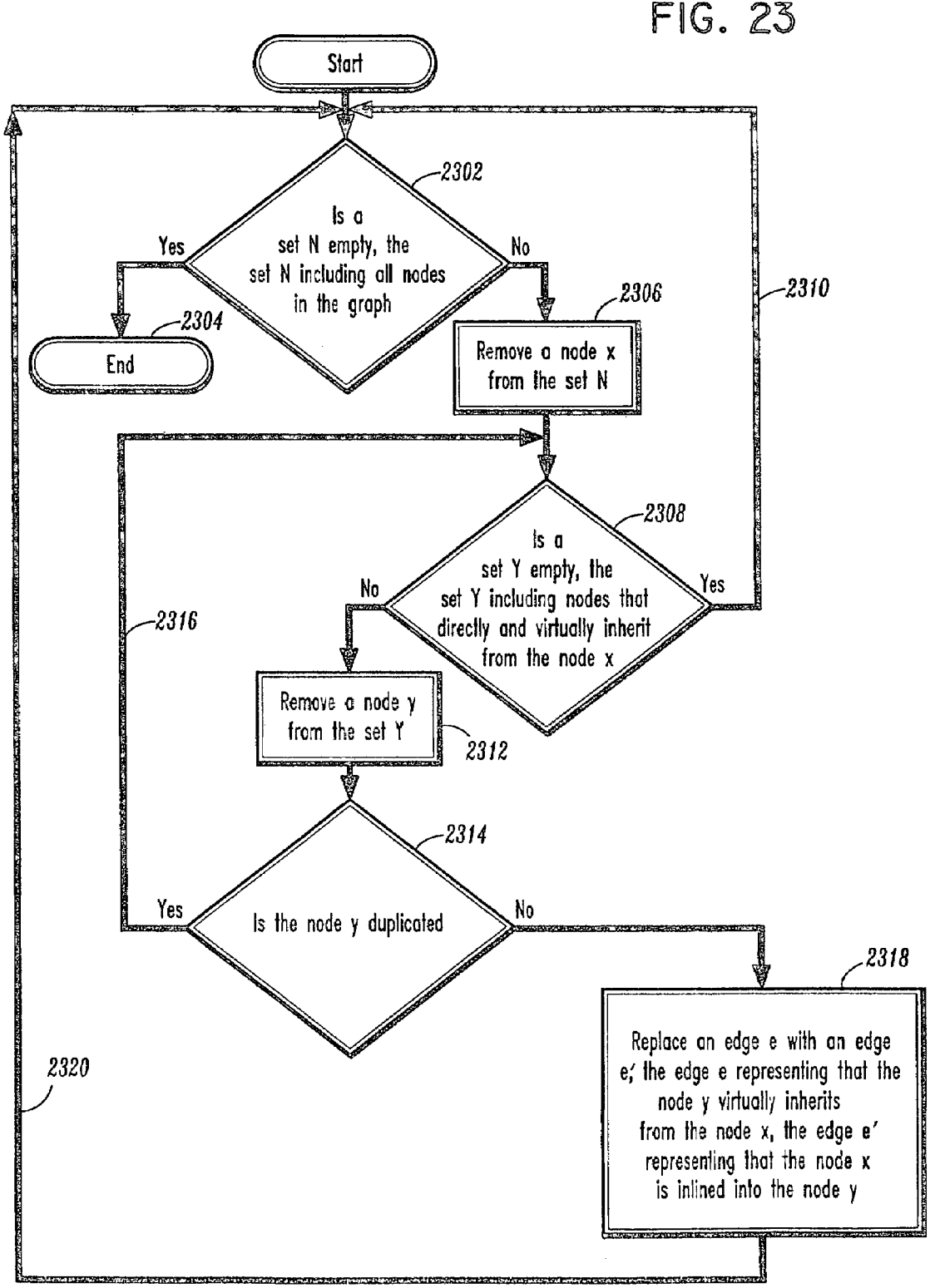
FIG. 23 is a flow chart of a method for implementing virtual bases with fixed offsets in a class hierarchy graph corresponding to an object oriented program according to an embodiment of the present invention.

FIG. 23 is a flow chart of a method for implementing virtual bases with fixed offsets in a class hierarchy graph corresponding to an object oriented program according to an embodiment of the present invention. The graph has nodes representing object classes and edges representing immediate inheritance therebetween.

In the method of FIG. 23, it is determined if a set N is empty, the set N including all nodes in the graph (step 2302). If the set N is empty, then the method is terminated (step 2304). On the other hand, if the set N is not empty, then a node x is removed from the set N (step 2306).

It is then determined if a set Y is empty, the set Y including all nodes in the graph that directly and virtually inherit from the node x (step 2308). If the set Y is empty, then a return is made to the step of determining if the set N is empty (i.e., step 2302) (step 2310). On the other hand, if the set Y is not empty, then a node y is removed from the set Y (step 2312).

It is then determined if the node y is duplicated in the graph (step 2314). If the node y is duplicated, then a return is made to the step of determining if the set Y is empty (i.e., step 2308) (step 2316). On the other hand, if the node y is not duplicated, then an edge e is replaced with an edge e' (step 2318). The edge e represents that the node y virtually inherits from the node x, and the edge e' represents that the node x has a fixed offset with respect to the node y (i.e., the node x is inlined into the node y). Upon replacing the edge e, a return is made to the step of determining if the set N is empty (i.e., step 2302) (step 2320).

Procedure simple-inline-VB introduced a new kind of inheritance edge. In writing y<_i x we mean that x is an immediate virtual base of y and also that x is inlined into The exists statement in procedure simple-inline-VB is nondeterministic, and it is not clear a priori which descendant to inline into. For example, in the subobject graph shown in FIG. 6, a could be inlined into either b or c, but not into both. It seemed better to inline it into b, since this inlining reduces the size of instances of three classes (b, d L and e) as opposed to only two classes c and e if the inlining was into c.

A more powerful version of inlining virtual bases is provided in the following procedure (hereinafter referred to as "inline-VB"). It is based on the observation that a virtual base may be inlined into more than one of its nonduplicated subobjects provided that they do not have a common descendant.

```
[1]    Procedure inline-VB (Node v, Hierarchy H)
[2]    Begin
```

-continued

```
[3]        Let V ←{u|u <_v v ∧¬is-duplicated(u)}
[4]        Let E ←{(u_1, u_2)|u_1, u_2 ∈ V, HCD (u_1, u_2)}
[5]        Let G ←(V,E)
[6]        Select S ⊆ V, S maximal independent set in G
[7]        For each s ∈ S do
[8]            H ←H − (s <_v v)
[9]            H ←H + (s <_i v)
[10]       od
[11]   end
```

Figure 24:
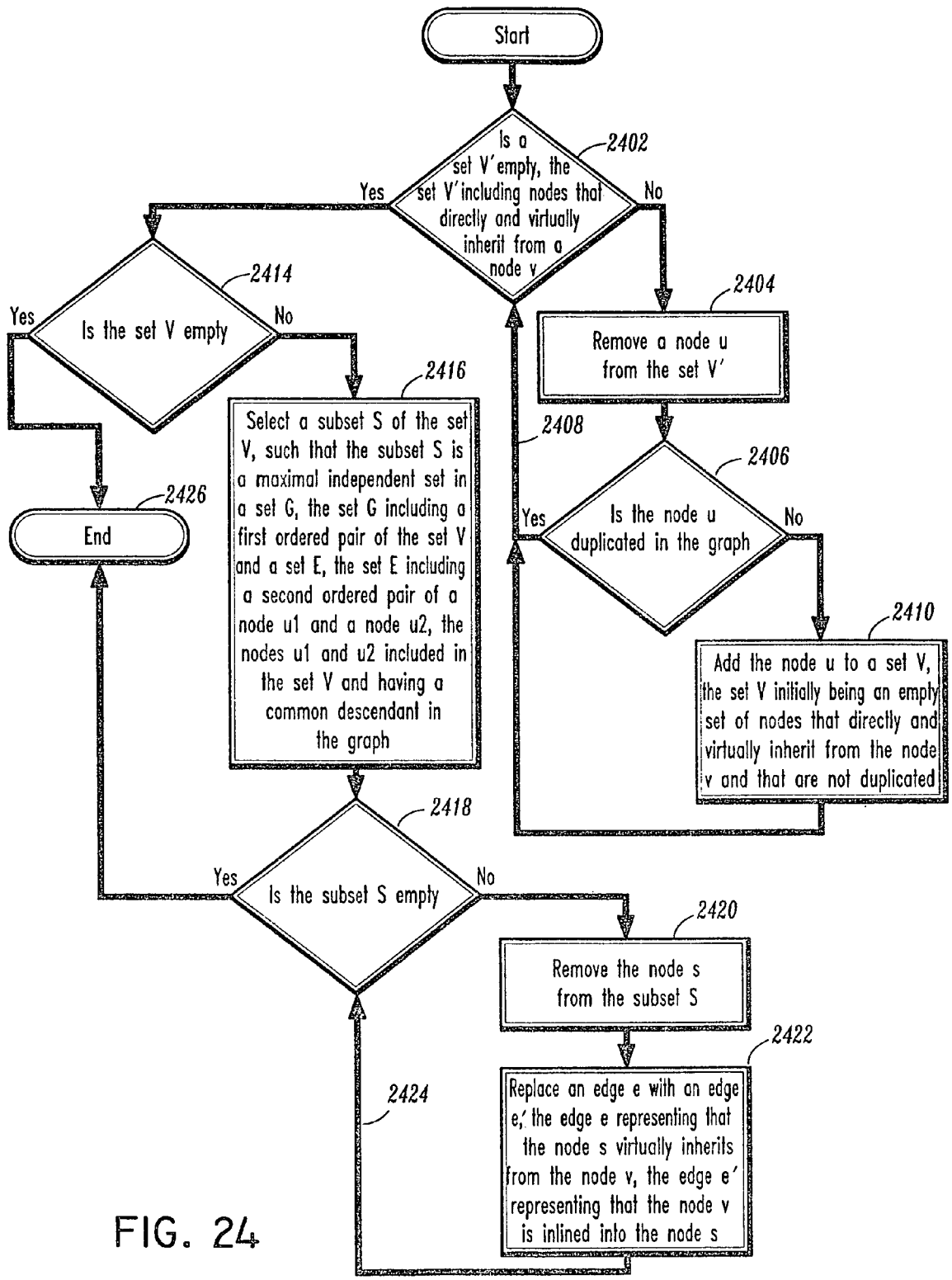
FIG. 24 is a flow chart of a method for implementing virtual bases with fixed offsets in a class hierarchy graph corresponding to an object oriented program according to another embodiment of the present invention.

FIG. 24 is a flow chart of a method for implementing virtual bases with fixed offsets in a class hierarchy graph corresponding to an object oriented program according to another embodiment of the present invention. The graph has nodes representing object classes and edges representing immediate inheritance therebetween.

It is determined if a set V' is empty, the set V' including nodes that directly and virtually inherit from a node v in the graph (step 2402). If the set V' is not empty, then a node u is removed from the set V' (step 2404).

It is then determined if the node u is duplicated in the graph (step 2406). If the node u is duplicated, then a return is made to the step of determining if the set V' is empty (i.e., step 2402) (step 2408). On the other hand, if the node u is not duplicated, then the node u is added to a set V (step 2410). The set V is initially an empty set of nodes that directly and virtually inherit from the node v and that are not duplicated in the graph. Upon adding the node u to the set V, a return is made to the step of determining if the set V' is empty (i.e., step 2402) (step 2412).

If set V' was determined to be empty at step 2402, then it is determined if the set V is empty (step 2414). If the set V is not empty, then a subset S of the set V is selected such that the subset S is a maximal independent set in a set G (step 2416). The set G includes a first ordered pair of the set V and a set E. The set E includes a second ordered pair of a node u1 and a node u2. The nodes u1 and u2 are included in the set V and have a common descendant in the graph.

It is then determined if the subset S is empty (step 2418). If the subset S is not empty, then a node s is removed from the subset S (step 2420), and an edge e is replaced with an edge e' (step 2422). The edge e represents that the node s virtually inherits from the node v, and the edge e' represents that the node v has a fixed offset with respect to the node s (i.e., the node v is inlined into the node u). A return is then made to the step of determining if the subset S is empty (step 2424). If the set V is determined to be empty at step 2414 or the subset S is determined to be empty at step 2418, then the method is terminated (step 2426).

To understand the procedure, recall that a set of nodes is independent in a graph, if no two nodes in it are connected by an edge. The maximal independent set problem finds an independent set that maximizes the number of its members. This version of inlining covers edge devirtualization: if an (y<_v x) would have been devirtualized by eliminate-single-VI, then in the graph G of inline-VB, node y would have no edges incident on it, and therefore would be part of the maximal independent set.

Unfortunately, the maximal independent set problem is known to be NP (non-deterministic polynomial) complete. This was described by M. Garey and D. Johnson, in Computers and Intractability: A Guide to the Theory of NP-Completeness, W. H. Freeman and Co., 1979. This means that the best way, at least to the extent known so far, of finding such a set is not significantly better than trying out all possible different sets S. Although this exponential computation time sounds deterring, inline-VB may be feasible in many cases, since it is exponential only in the number of immediate virtual descendants, which could be a small number in practice.

A description of how the transformations presented above can be combined together into two cohesive procedures will now be given. For any such procedure, eliminate-transitive-edges should always be applied first to a class hierarchy before either edge devirtualization or inlining. To see this, consider the transitive edge $(a<_v d)$ in FIG. 13($a$). Eliminate-transitive-edges enables eliminate-single-VI, since only after the transitive edge $(a<_v d)$ is eliminated, can $(a<_v b)$ be devirtualized. Eliminate-transitive-edges eliminates inferior inlining candidates. Inlining a into d attains the same benefits or less than inlining a into b and, therefore, is inferior. But $(a<_v d)$ is a transitive edge. Procedures eliminate-transitive-edges and eliminate-single-VI should be executed before simple-inline-VB to ensure that only shared bases are inlined.

There are two natural ways to combine the above transformations. The first is provided in the following procedure (hereinafter referred to as "streamline-VI"), which has an overall execution time bounded by the complexity of eliminate-single-VI.

| [1] | Procedure streamline-VI (Hierarchy H) |
| [2] | Begin |
| [3] | eliminate-transitive-edges (H) |
| [4] | eliminate-single-VI (H) |
| [5] | simple-inline-VB (H) |
| [6] | end |

Figure 25:
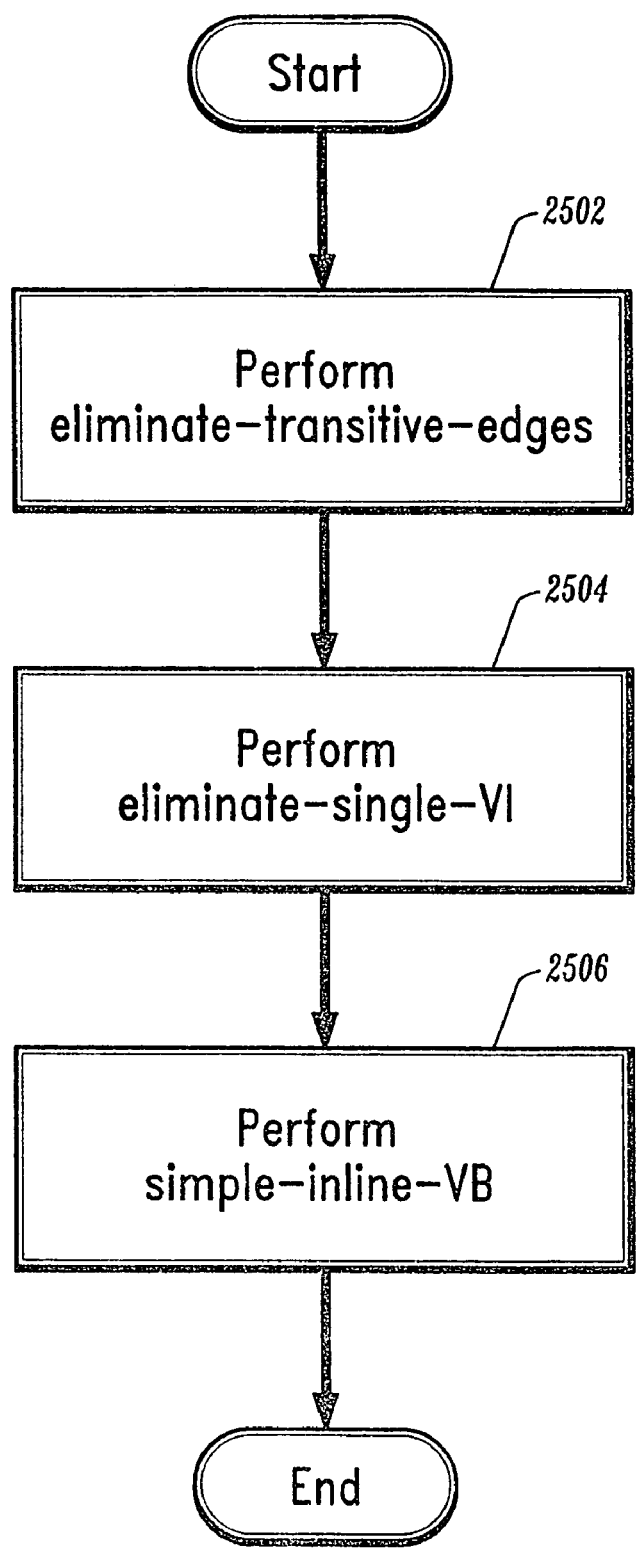
FIG. 25 is a flow chart of a method for streamlining the overall inlining process according to an embodiment of the present invention.

FIG. 25 is a flow chart of a method which combines the three above transformations (procedures) to streamline the overall inlining process according to an embodiment of the present invention. First, the procedure eliminate-transitive-edges is performed (step 2502). Next, the procedure eliminate-single-VI is performed (step 2504). Lastly, the procedure simple-inline-VB is performed (step 2506).

The second is provided in the following procedure (hereinafter referred to as "streamline-VIA"), which has an overall execution time bounded by the complexity of inline-VB. Since inline-VB will inline single virtual inheritance edges, eliminate-single-VI is not needed in streamline-VIA.

| [1] | Procedure streamline-VIA (Hierarchy H) |
| [2] | Begin |
| [3] | eliminate-transitive-edges (H) |
| [4] | For each node n in H do |
| [5] | inline-VB (n, H) |
| [6] | od |
| [7] | end |

Figure 26:
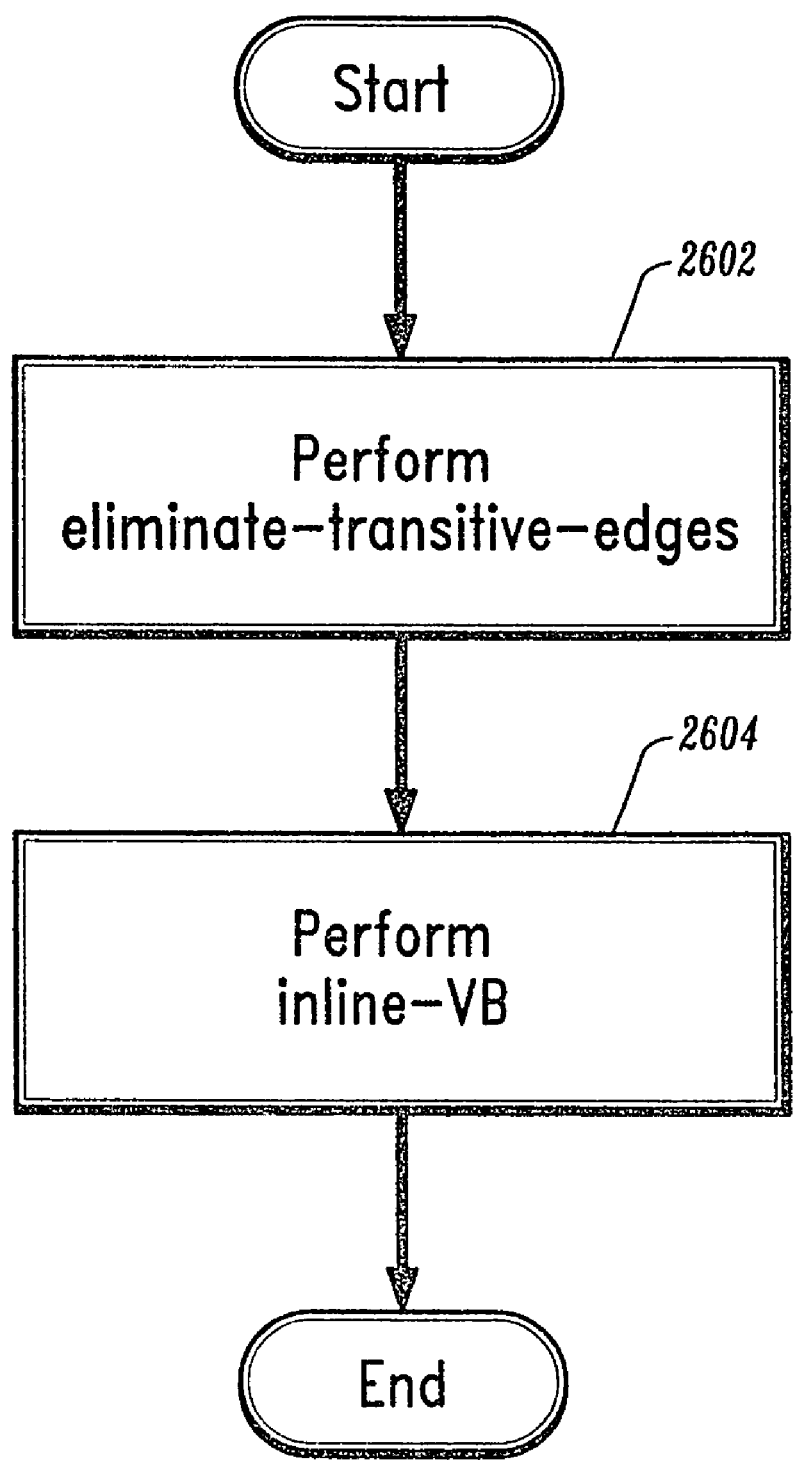
FIG. 26 is a flow chart of a method which combines two of the three transformations described herein to streamline the overall inlining process according to an embodiment of the present invention.

FIG. 26 is a flow chart of a method which combines two of the three above transformations (procedures) to streamline the overall inlining process according to an embodiment of the present invention. First, the procedure eliminate-transitive-edges is performed (step 2602). Lastly, the procedure inline-VB is performed (step 2604).

Both the elimination of transitive inheritance edges and edge devirtualization or inline-VB are needed to remove the circle notation which identifies shared bases in a class hierarchy. The application of these procedures makes the circle notation for virtual classes in subobject graphs redundant. Nevertheless, we retain circle notation because it highlights virtual bases. If these procedures have been applied, then shared bases are exactly those nodes in the subobject graph whose in-degree is greater than one.

Of the three transformations presented, only eliminate-single-VI is a source-to-source transformation. As noted above, eliminate-transitive-edges must be applied after static semantic checking of the program. Simple-inline-VB and inline-VB must be performed on an intermediate representation of the application as there is no analogous language construct with which to represent inlined inheritance. Therefore, either version of streamline-VI may be applied to an application's intermediate representation.

The decision of whether streamline-VI should be invoked when whole program information is available is not a hard one. The procedure streamline-VI will never increase the execution-time or memory consumption of an application. Moreover, the run-time of the first two transformations and the simple-inline-VB are only polynomial. The run-time of inlining-VB depends on the extent of the optimization that is applied. There are, however, good heuristics for the maximal independent set that run in polynomial time.

Systems providing whole program information include the IBM Visual Age C++ compiler and Vortex. The former is described by M. Karasick, in "The Architecture of Montana: An Open and Extensible Programming Environment with an Incremental C++ Compiler", Proceedings Foundations of Software Engineering (FSE'98), Orlando, Fla., November 1997; and L. Nackman and J. Barton, in "Base-Class Composition with Multiple Derivation and Virtual Bases", Proceedings of the Sixth Usenix C++ Technical Conference, 1994. Vortex is described by C. Chambers, J. Dean, and D. Grove, in "Whole-Program Optimization of Object-Oriented Languages", Technical Report UW-CSE-96-06-02, U. of Wash., Dept. of Computer Science and Engineering, June 1996.

Figure 27:
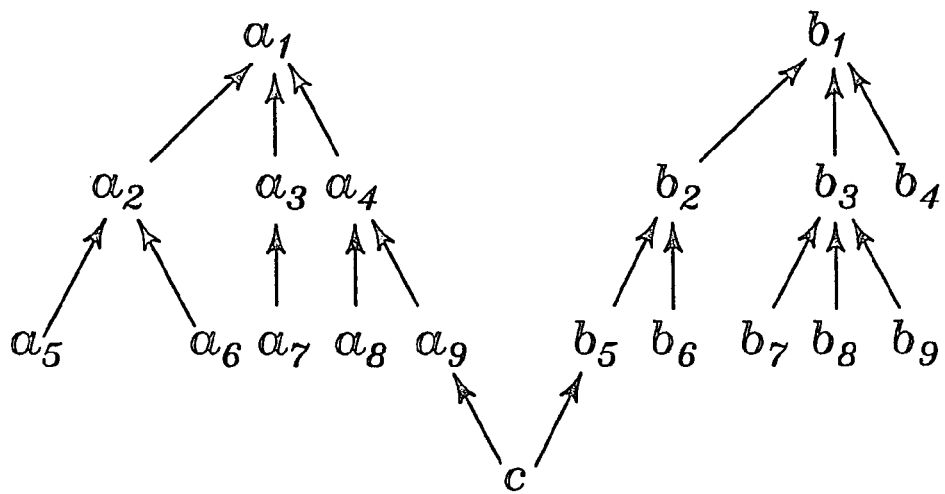
FIG. 27 is a diagram of a hierarchy used to exemplify bidirectional layout according to the present invention.

A description of bidirectional layout techniques according to the present invention will now be given. FIG. 27 is a diagram of a hierarchy used to exemplify bidirectional layout according to the present invention. Given the inheritance hierarchy of FIG. 27, the traditional object layout scheme requires only one VPTR for all the classes, except for class c which requires two VPTRs.

Figure 28:
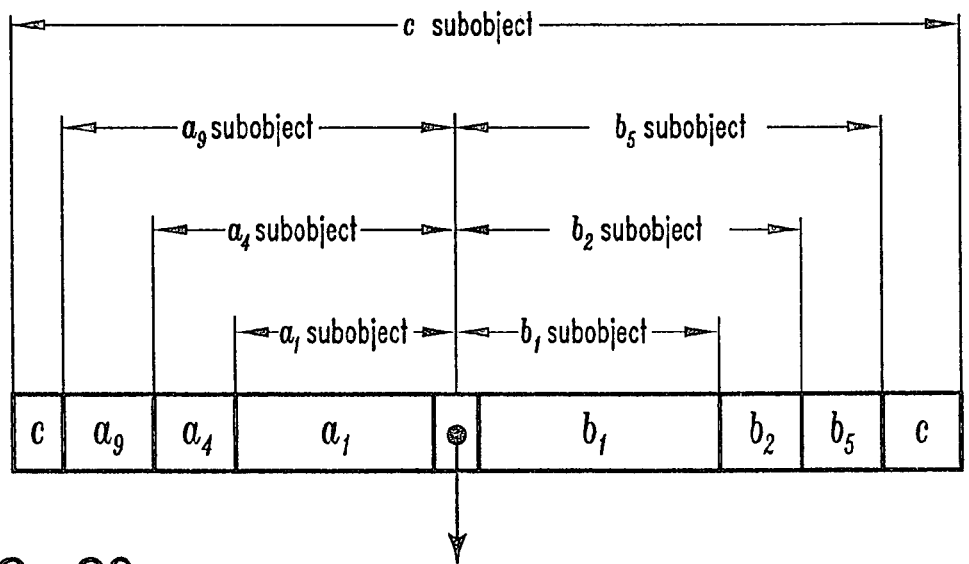
FIG. 28 is a diagram illustrating bidirectional layout of class c of FIG. 27.

FIG. 28 is a diagram illustrating bidirectional layout of class c of FIG. 27. We can layout class c using only one VPTR as shown.

Figure 29:
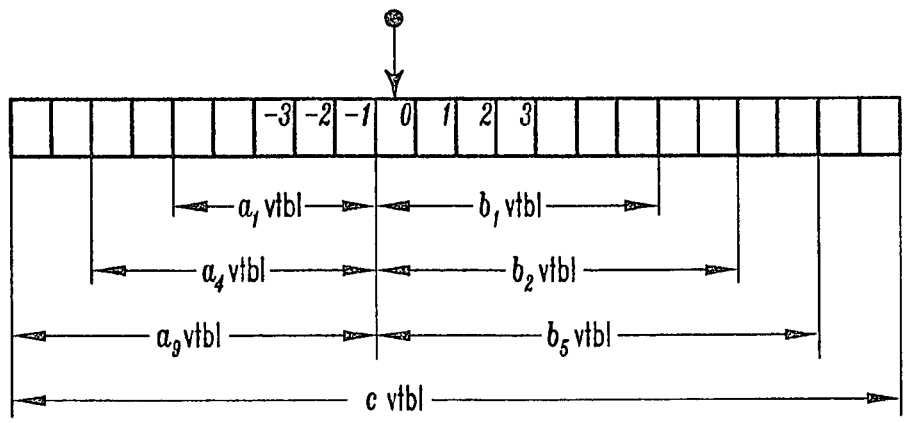
FIG. 29 is a diagram of a bidirectional layout of the VTBL of class c of FIG. 27.

Suppose that class $a_1$, is laid out using negative offsets. That is to say, its VPTR will be at offset zero, and all its data members, user-defined and compiler-generated (other than its VPTR), are laid out in decreasing addresses. This will force what we may call a negative directionality on all classes $a_1, \ldots, a_9$. Similar layout is imposed on the VTBL: functions associated with classes $a_1, \ldots, a_9$ will occupy entries $-1, -2, \ldots$ in their table. Classes $b_1, \ldots, b_9$ will still have a positive directionality, with their entries at offsets 0, 1, ... in their VTBL. Classes $a_9$ and $b_5$ are married in class c: they share their VPTR as illustrated in FIG. 29, which is a diagram of a bidirectional layout of the VTBL of class c of FIG. 27.

In addition to marrying subobjects that are inherited and have opposite directionality, subobjects that are fields of an object may also be married if they have opposite directionalities; that is, one field has positive directionality and the other field has negative directionality.

Consider a class A that has two fields F1 and F2, such that F1 has type class B and F2 has type class C. If the directionality of class B and class C are opposite, then F1 and F2 can be married and share a virtual function table pointer in an A object. This sharing is persistent; that is, F1 and F2 will continue to share a virtual functional table pointer when class A is further derived.

Finally, if classes A and B have opposite directionality, then the run-time system could marry an object of type A and an object of type B together to share a virtual function table pointer when objects of these class types are allocated.

The directionality of a class x is denoted by $\chi^{(x)}$. In the traditional layout, $\chi^{(x)}$=positive for all x. With bidirectional layout, $\chi^{(x)}$ can be either positive or negative. If this is the case, then we say that x is "directed".

Two more values which $\chi^{(x)}$ can assume are mixed and none. Mixed is used if x shares its VPTR with two base classes that are married with each other. None occurs if x and all of its base classes have no virtual functions and consequently x has no need for a VPTR. In both cases we will say that x is undirected. The predicate $\chi^{(x)}=-\chi^{(y)}$ means that either $\chi^{(x)}$=positive and $\chi^{(y)}$=negative or that $\chi^{(x)}$=negative and $\chi^{(y)}$=positive. The semantics of the different values of $\chi^{(x)}$ are summarized in Table 1.

TABLE 1

| $\chi^{(X)}$ | a | b | c | d |
|---|---|---|---|---|
| positive | yes | no | yes | 0, 1, ... |
| negative | yes | yes | no | −1, −2, ... |
| mixed | yes | yes | yes | ..., −2, −1, 0, 1, ... |
| none | no | no | yes | none |

The notations used in FIG. 1 are as follows:
a: a VPTR at offset zero
b: data members in negative offsets
c: data members in positive offsets
d: indices of VTBL entries In order for bidirectional layout to work in a separate compilation setting, we need an oracle to assign the right directionalities to classes $a_1$ and $b_1$, when they are compiled, which could be prior to the compilation of class c. A simple and effective work around is to assign directionalities at random.

The following procedure (hereinafter referred to as "assign-initial-directionality") may be used to assign directionalities to classes whose directionality is not determined by their parents. This will insure that with probability 0.5, one VPTR will be saved in class c. We can say that the expected savings is 0.5·1=0.5 VPTR.

| [1] | Procedure assign-initial-directionality (Node n) |
| [2] | Begin |
| [3] | If n has no virtual functions then |
| [4] | $\chi^{(n)} \leftarrow$ none |
| [5] | Else |
| [6] | $\chi^{(n)} \leftarrow$ Random(n) |
| [7] | fi |
| [8] | end |

Figure 30:
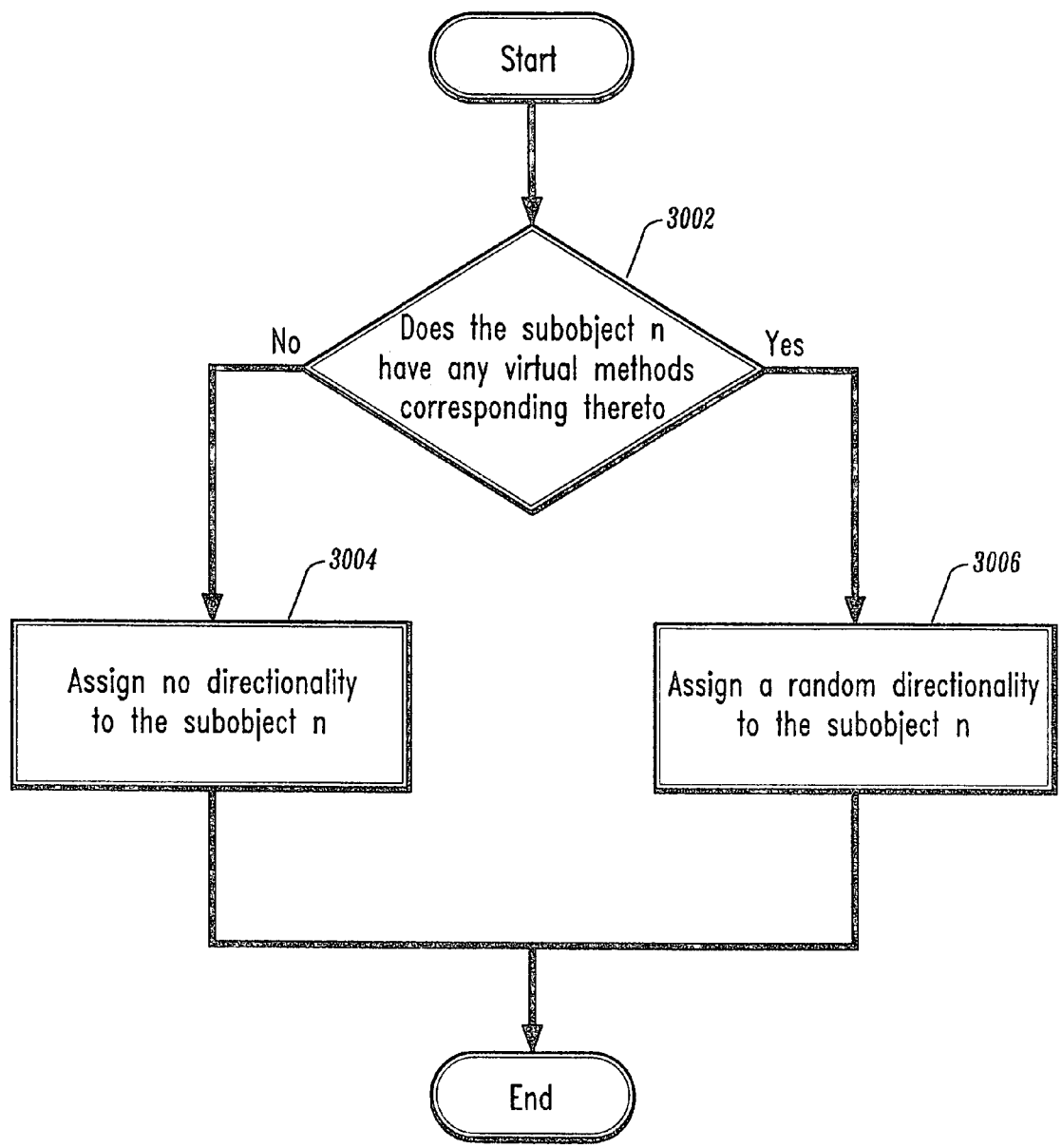
FIG. 30 is a flow chart of a method for assigning an initial directionality to a subobject n in an object layout chart corresponding to an object class.

FIG. 30 is a flow chart of a method for assigning an initial directionality to a subobject n in an object layout chart corresponding to an object class. The chart includes subobjects of the object class and virtual function table pointers for pointing to virtual function tables of the subobjects.

It is determined if the subobject n has any corresponding virtual methods (step 3002). If the subobject n does not have any corresponding virtual methods, then no directionality is assigned to the subobject n (step 3004). On the other hand, if the subobject n has any corresponding virtual methods, then a random directionality is assigned to the subobject n (step 3006).

The crucial point in computing this expectation is that the "coin-tosses" in $a_1$ and $b_1$ were independent. More generally, an expected savings can be guaranteed if any two selections of directionalities to root classes are independent. It is not necessary however to have independence between any three selections. To implement "pair-wise-independence" random selection we can apply a standard technique of randomized algorithms, such as that described by L. Carter and M. Wegman, in "Universal Classes of Hash Functions", J. Comput. Sys. Sci., 18:143-154, 1979, and then replace the coin tosses by a hash function. In other words, whenever a compiler encounters a class whose directionality is not forced, it applies a hash function, selected at random from a universal class of such functions, to its name. The value of the hash function determines whether the class has positive or negative directionality. Thus, we will use the following procedure (hereinafter referred to as "random") as a pseudo random-number generator. That is, the procedure random will be used to return the pseudo-random directionality assignment of a class.

| [1] | Function random (Noden) |
| [2] | Begin |
| [3] | If odd (hash(n)) then |
| [4] | Return positive |
| [5] | else |
| [6] | Return negative |
| [7] | fi |
| [8] | end |

Figure 31:
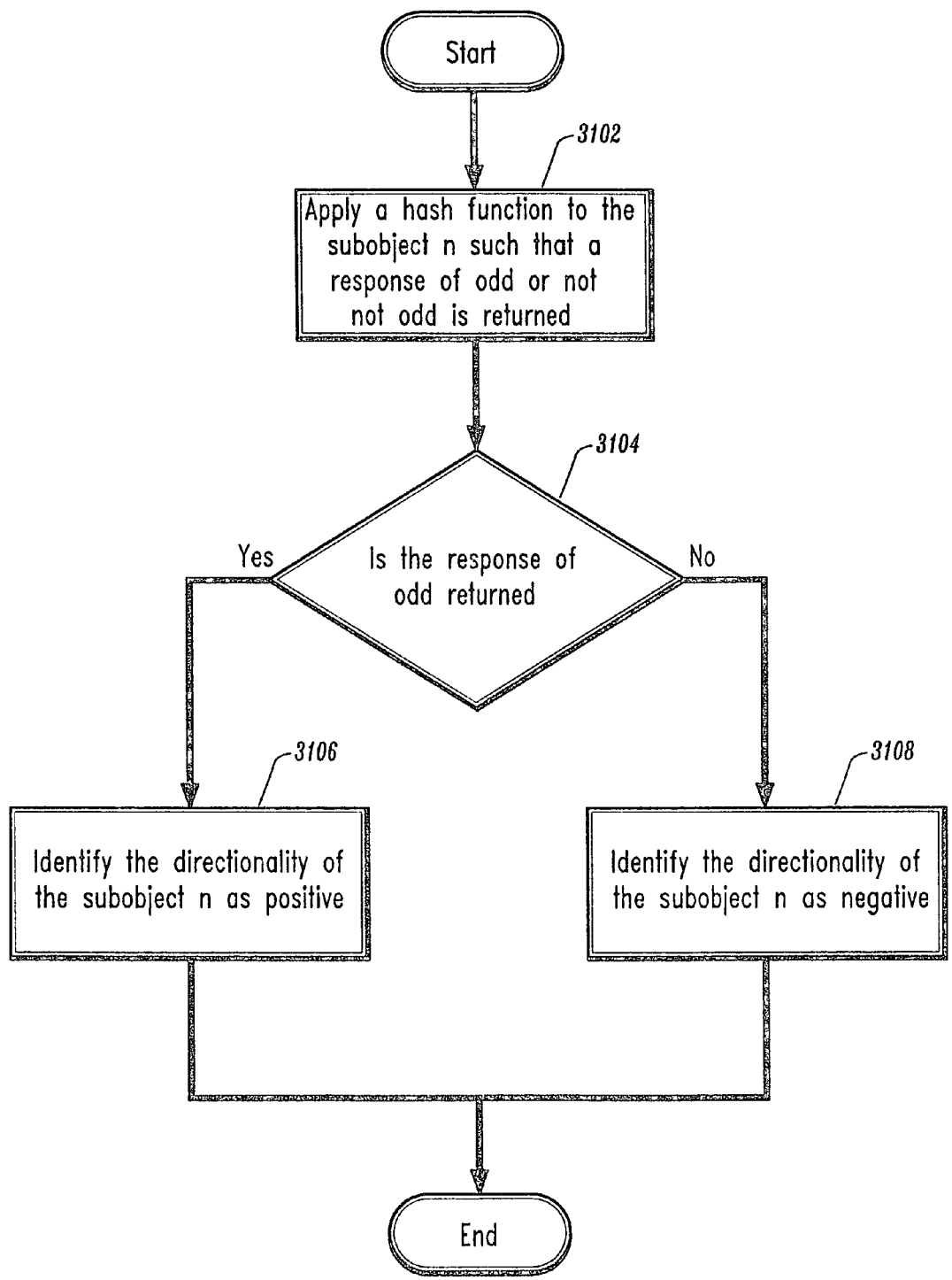
FIG. 31 is a flow chart of a method for randomly assigning a directionality to a subobject n in an object layout chart corresponding to an object class.

FIG. 31 is a flow chart of a method for randomly assigning a directionality to a subobject n in an object layout chart corresponding to an object class. The chart includes subobjects of the object class and virtual function table pointers for pointing to virtual function tables of the subobjects.

A hash function is applied to the subobject n such that a response of odd or not odd is returned (step 3102). It is then determined if the response of odd is returned (step 3104). If the response of odd is returned, then the directionality of the subobject n is identified as positive (step 3106). On the other hand, if the response of not odd is returned, then the directionality of the subobject n is identified as negative (step 3108).

One major advantage of a hash function compared to coin-tosses is that, once it has been selected, its values can be reproduced in independent runs of the compiler.

A description of the "ephemeral marriage" of virtual bases according to an embodiment of the present invention will now be given. The phrase "ephemeral marriage" is hereinafter used to refer to the case wherein two virtual subobjects laid out in opposite directions in an object layout chart share the same virtual function table pointer. An ephemeral marriage is not persistent, in contrast to "persistent marriage" described hereinbelow.

The use of indirection in the implementation of virtual base subobjects makes it possible to place them anywhere in memory. This degree of freedom, together with bidirectional layout, unfolds saving opportunities beyond those suggested by our motivating example. Let $v_1$ and $v_2$ be two virtual bases, direct or indirect, of class u, and suppose that $\chi^{(v1)}$=positive and $\chi^{(v2)}$=negative. Then, between $v_1$ and $v_2$ we could save one VPTR, by placing them against each other in the layout of u. We say that $v_1$ and $v_2$ are married in u, but in contrast with the marriage of nonvirtual base classes $a_9$ and $b_5$, this marriage is ephemeral. Subobjects $v_1$ and $v_2$ are not necessarily married with each other in every context in which they occur together. In other words, even though the subobjects of $v_1$ and $v_2$ are adjacent in objects of class u, they are not necessarily adjacent if u occurs as a subobject of another class w, w<u. Therefore, it is necessary that u maintains two VBPTRs, one for $v_1$ and one for $v_2$.

The following procedure (hereinafter referred to as "ephemeral-virtual-base-marriage") is used to provide an ephemeral marriage of virtual bases. The procedure allows for a class to be temporarily married with one of its parents.

```
[1]    Procedure ephemeral-virtual-base-marriage (Node u)
[2]    Begin
[3]        Let V ←{v|u ≺ᵥ v}
[4]        If χ⁽ᵘ⁾ = positive Vχ⁽ᵘ⁾ = negative then
[5]            V ←V U {u}
[6]        fi
[7]        Let V⁺← {v ∈ V|χ⁽ᵛ⁾ = positive}
[8]        Let V⁻← {(v ∈ V|χ⁽ᵛ⁾ = negative}
                    Marry unmarried virtual bases
[9]        While V⁺ ≠ ∅ ∧V⁻ ≠ ∅ do
[10]           Select v₁ ∈ V⁺ and v₂ ∈ V⁻
[11]           Marry v₁ and v₂
[12]           V⁺← V⁺ - v₁
[13]           V- ←V⁻ - v₂
[14]       od
[15]   end
```

Figure 32:
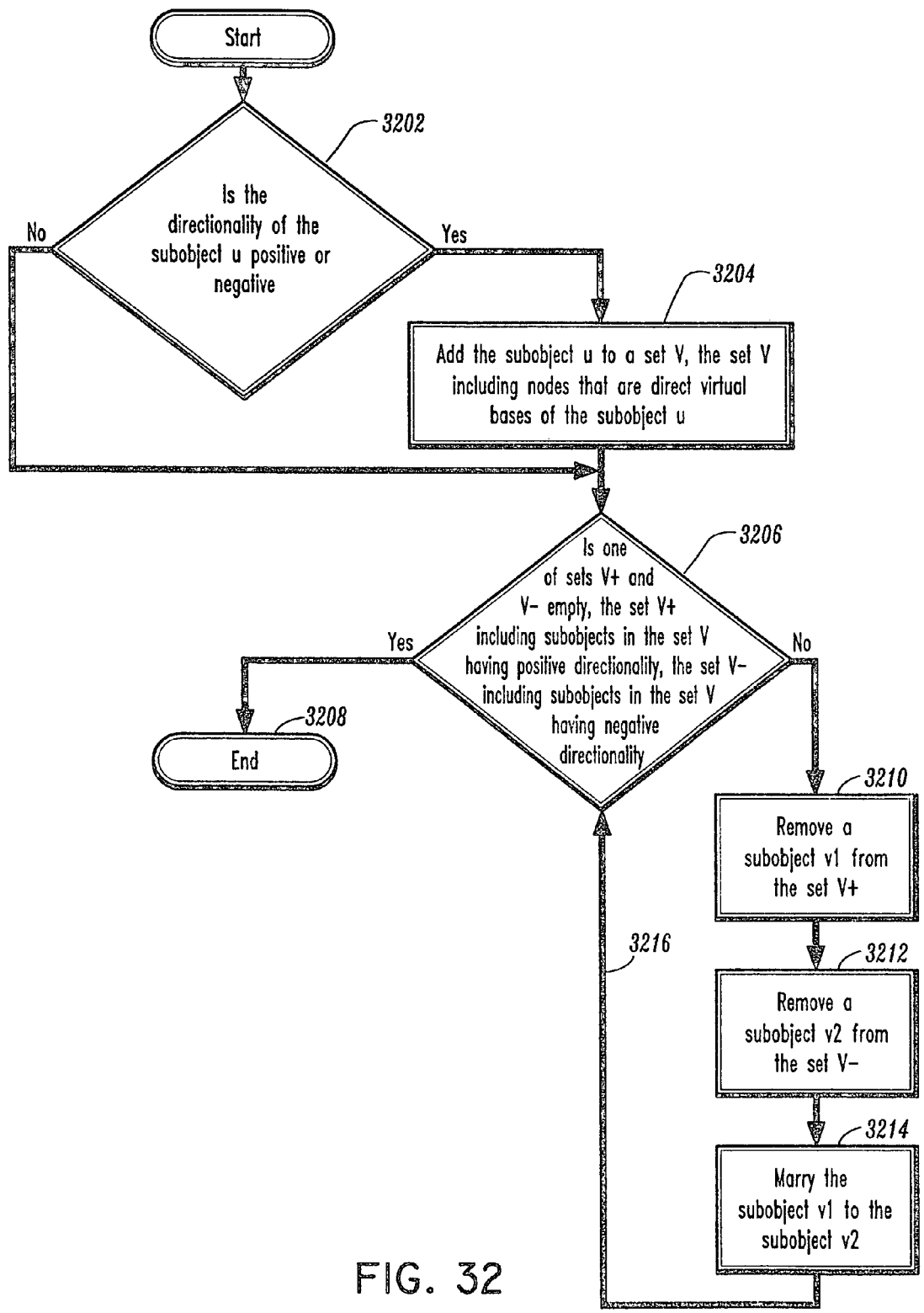
FIG. 32 is a flow chart of a method for sharing virtual function table pointers between virtual subobjects in an object layout chart corresponding to an object class.

FIG. 32 is a flow chart of a method for sharing virtual function table pointers between virtual subobjects in an object layout chart corresponding to an object class. The virtual function table pointers point to virtual function tables of the subobjects.

It is determined if a directionality of a subobject u is one of positive and negative (step 3202). The subobject u is added to a set V, when the directionality of the subobject u is one of positive and negative (step 3204). The set V includes nodes that are direct virtual bases of the subobject u. The set V also includes the subobject u, if the subobject u is directed.

Upon adding the subobject u to the set V or if the directionality of the subobject u is not one of positive and negative (as determined at step 3202), then it is determined if one of sets V+ and V− is empty (step 3206). The set V+ includes subobjects in the set V having positive directionality, and the set V− includes subobjects in the set V having negative directionality.

If one of the sets V+ and V− is empty, then the method is terminated (step 3208). On the other hand, if both of the sets V+ and V− are not empty, then a subobject v1 is removed from the set V+ (step 3210), and a subobject v2 is removed from the set V− (step 3212). The subobject v1 is married to the subobject v2 (i.e., the subobject v1 and the subobject v2 share a virtual function table pointer)(step 3214), and a return is made to the step of determining if one of the sets V+ and V− is empty (i.e., step 3206.) (step 3216).

The procedure assumes that a directionality was already assigned to the class and to all of its parents. In particular, the procedure is expected to be executed after the procedure (presented below) that persistently marries nonvirtual bases.

Figure 5:
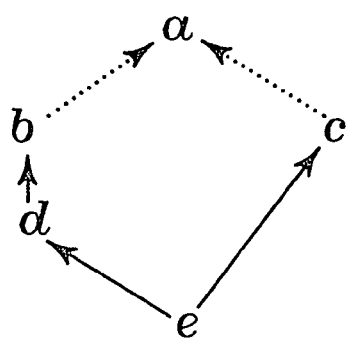
FIG. 5 is a diagram of the class hierarchy of FIG. 2, illustrating shared inheritance.
Figure 33:
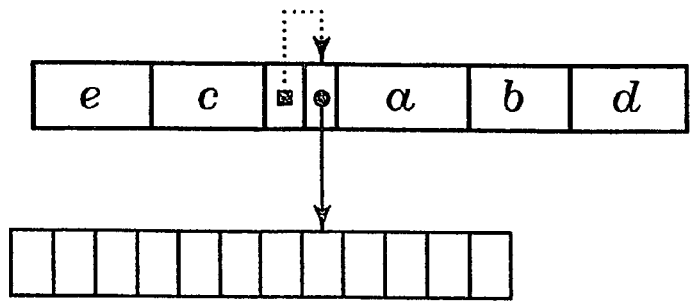
FIG. 33 is a diagram illustrating the application of both virtual base inlining and bidirectional layout to class e of the hierarchy of FIG. 5.

Consider again the hierarchy of FIG. 5. Suppose that $\chi^{(a)}$=positive and that $\chi^{(e)}$=negative. Then, procedure ephemeral-virtual-base-marriage improves further the layout of FIG. 21 obtaining the layout of FIG. 33, which is a diagram illustrating the application of both virtual base inlining and bidirectional layout to class e of the hierarchy of FIG. 5. Advantageously, the layout of FIG. 33 uses only one VPTR and one VBPTR. Moreover, notice that, unlike non-virtual inheritance, if the virtually derived classes of a base are directed, their directionalities may be different.

The marriage of two virtual bases requires that their VTBLs are juxtaposed. Since, in general, a class has a different VTBL for every context this class is used, marriage incurs no additional overhead. When classes $v_1$ and $v_2$ are married in u, we also place the VTBL of $v_1$ class in a u context against the VTBL of $v_2$ in a u context. If the VTBL of, for example, $v_1$ in a u context happens to be exactly the same as that of a derived class of u, w, then the marriage of $v_1$ may make it impossible to optimize class space by using only one VTBL for $v_1$ in w and for $v_1$ in u.

A description of "persistent marriage" of nonvirtual bases will now be given. The phrase "persistent marriage" is hereinafter used to refer to the case wherein, in an, object layout chart of an object x, two nonvirtually inherited subobjects laid out in opposite directions share the same virtual function table pointer and continue to share the same virtual function table pointer when x is further derived.

Let us now proceed to the description of bidirectional layout for nonvirtual bases. Let us assume inductively that a directionality was assigned to all classes from which a class u inherits, and that all these classes were laid out already. The questions are then how should u be laid out, what kind of sharing of VPTRs will u have with its parents, and what should $\chi^{(u)}$ be. The following procedure (hereinafter referred to as "bidirectional-layout") answers these questions, by detailing how the nonvirtual bases of u are married together in u.

```
[1]    Procedure bidirectional-layout (Node u)
[2]    Begin
[3]        Let V ←{v|u ≺ᵣ v Vu ≺ᵢ v}
[4]        Case |V| of
[5]            0: //u is a root
[6]                        assign-initial-directionality (u)
[7]            1: //u has exactly one parent
[8]                Let v be the single parent of u
[9]                If χ⁽ᵛ⁾ ⁻ none then
[10]                       assign-initial-directionality(u)
[11]               else
[12]                       χ⁽ᵘ⁾ ←χ⁽ᵛ⁾
[13]                       Share a VPTR with v.
[14]               fi
[15]           2: //u has exactly two parents
[16]               Let v₁ and v₂ be the two parents of u
[17]               If χ⁽ᵛ¹⁾ ⁻ χ⁽ᵛ²⁾ = none then
[18]                       assign-initial-directionality(u)
[19]               else if χ⁽ᵛ¹⁾ ⁻ -χ⁽ᵛ²⁾ then
                        // a VPTR is saved in the layout of u
[20]                       χ⁽ᵘ⁾ ←mixed
[21]                       Marry v₁ and v₂
[22]                       Share VPTR with v₁   //wlog could share
                                            with v₂
[23]               else if exists i, i = 1, 2 s.t. vᵢ is directed
                        then
[24]                       χ⁽ᵘ⁾ ←χ⁽ᵛⁱ⁾
[25]                       Share a VPTR with vᵢ
[26]               else
                // one parent is mixed, the other is mixed or none
[27]                   Let vᵢ be a parent of u that is mixed
[28]                   χ⁽ᵘ⁾ ←mixed
[29]                   Share a VPTR with vᵢ
[30]               fi
[31]           Otherwise: //u has more than two parents
[32]                   pairup(u)
[33]        esac
[34]    end
```

FIG. 34 is a flow chart of a method for laying out a subobject u in an object layout chart corresponding to an object class. The chart includes subobjects of the object class and virtual function table pointers for pointing to virtual function tables of the subobjects.

It is determined if a set V is empty, the set V comprising subobjects that have a fixed offset with respect to the subobject u and that are directly inherited from the subobject u (step 3402). If the set V is empty, then an initial directionality is assigned to the subobject u (step 3404).

If the set V is determined to not be empty at step 3402, then it is determined if the set V has only one member (step 3406). If the set V has only the one member, then it is determined if a directionality of a subobject v in the set V is unassigned (step 3408). In this case, the subobject v is a single parent subobject of the subobject u.

If the directionality of the subobject v is unassigned, then an initial directionality is assigned to the subobject u (step 3410). On the other hand, if the directionality of the subobject v is assigned, then the directionality of the subobject v is assigned to the subobject u and a virtual function table pointer is shared between the subobjects v and u (step 3412).

If the set V is determined to not have only the one member at step 3406, then it is determined if the set V has only two members (step 3414). If the set V has only the two members, then it determined if directionalities of subobjects v1 and v2 in the set V are unassigned (step 3416). In this case, the subobjects v1 and v2 are both parent subobjects of the subobject u.

If the directionalities of the subobjects v1 and v2 are assigned, then it is determined if the directionalities of the subobjects v1 and v2 are opposing (step 3418). Opposing is intended to mean that one of the subobjects v1 and v2 is positive and the other is negative.

If the directionalities of the subobjects v1 and v2 are not opposing, then it is determined if any of the subobjects v1 and v2 are directed (step 3420). Directed is intended to mean either positive or negative, but not mixed. If any of the subobjects v1 and v2 are not directed, then the directionality of the subobject u is assigned as mixed (step 3422) and a virtual function table pointer is shared between the subobject u and any one of the subobjects v1 and v2 that is mixed (step 3424). In this case, one parent of u has mixed directionality.

If the directionalities of the subobjects v1 and v2 in the set V are determined to be unassigned at step 3416, then an initial directionality is assigned to the subobject u (step 3426).

If the directionalities of the subobjects v1 and v2 are determined to be opposing at step 3418, then the directionality of the subobject u is assigned as mixed (step 3428). Moreover, the subobject v1 is married to the subobject v2 and a virtual function table pointer is shared between the subobject u and one of the subobjects v1 and v2 (step 3430).

If any of the subobjects v1 and v2 are determined to be directed at step 3420, then the directionality of any of the directed subobjects is assigned to the subobject u (step 3432). Moreover, a virtual function table pointer is shared between the subobject u and the subobject v1 or v2 that is directed (step 3434).

If it is determined that the set V does not have only the two members at step 3414, then the procedure pairup is performed (step 3436).

The method is terminated (step 3438), upon performing any one of steps 3404, 3410, 3412, 3424, 3426, 3430, 3434, and 3436.

The cases in procedure bidirectional-layout in which u has no parents, only one parent, or two parents which both have the same directionality are rather pedestrian. The case where $\chi^{(v1)} = -\chi^{(v2)}$ is the most interesting one since it is the only case in which a VPTR is saved. Note that the procedure favors a none directionality for u. However, as in the vast majority of cases, this is not possible, it tries to make u directed, in order to leave open future optimization opportunities. Class u is assigned a mixed directionality only if there is no other choice.

When u has more than two parents, the above procedure bidirectional-layout calls the following procedure hereinafter referred to as "pairup". Procedure pairup simply generalizes the breakdown into different cases in bidirectional-layout when u has two parents. In one embodiment of the present invention, the procedure pairup could be used to completely replace the procedure bidirectional-layout.

| [1] | Procedure pairup(Node n) |
|---|---|
| [2] | Begin |
| [3] | Let $V \leftarrow \{v \mid n \prec_i v \lor n \prec_r v\}$ |
| [4] | Let $V^+ \leftarrow \{v \in V \mid \chi^{(v)} = \text{positive}\}$ |
| [5] | Let $V^- \leftarrow \{v \in V \mid \chi^{(v)} = \text{negative}\}$ |
| [6] | Let $V^\circ \leftarrow \{v \in V \mid \chi^{(v)} = \text{none}\}$ |
| [7] | Let $V^* \leftarrow \{v \in V \mid \chi^{(v)} = \text{mixed}\}$ |
| Marry pairs of opposite direction bases that are not yet married. | |
| [8] | While $V^+ \neq \emptyset \land V^- \neq \emptyset$ do |
| [9] | Select $v_1 \in V^+, v_2 \in V^-$ |
| [10] | Marry $v_1$ and $v_2$ |
| [11] | $V^+ \leftarrow V^+ - v_1$ |
| [12] | $V^- \leftarrow V^- - v_2$ |
| [13] | od |
| Assign directionality to n and determine sharing | |
| [14] | If $V^+ \neq \emptyset$ then |
| [15] | $\chi^{(n)} \leftarrow \text{positive}$ |
| [16] | Share a VPTR with $v \in V^+$ |
| [17] | else if $V^- \neq \emptyset$ then |
| [18] | $\chi^{(n)} \leftarrow \text{negative}$ |
| [19] | Share a VPTR with $v \in V^-$ |
| [20] | else if $V^* \neq \emptyset$ then |
| [21] | $\chi^{(n)} \leftarrow \text{mixed}$ |
| [22] | Share a VPTR with $v \in V^*$ |
| [23] | else if $v \in V \land \chi^{(v)} = \text{positive}$ then |
| [24] | $\chi^{(n)} \leftarrow \text{mixed}$ |
| [25] | Share a VPTR with v |
| [26] | else //only $V^\circ \neq \emptyset$ |
| [27] | assign-initial-directionality(n) |
| [28] | fi |
| [29] | end |

FIG. 35 is a flow chart of a method for laying out a subobject u in an object layout chart corresponding to an object class according to another embodiment of the present invention. The chart includes subobjects of the object class and virtual function table pointers for pointing to virtual function tables of the subobjects.

It is determined if one of sets V+ and V− is empty (step 3502). The set V+ includes subobjects in a set V having positive directionality. The set V− includes subobjects in the set V having negative directionality. The set V includes subobjects that have a fixed offset with respect to the subobject u and are directly inherited from the subobject u.

If both of the sets V+ and V− are not empty, then a subobject v1 is removed from the set V+ (step 3504), and a subobject v2 is removed from the set V− (step 3506). The subobject v1 is married to the subobject v2 (i.e., the subobject v1 and the subobject v2 share a virtual function table pointer) (step 3508), and a return is made to the step of determining if one of the sets V+ and V− is empty (step 3510).

On the other hand, if one of the sets V+ and V− is empty (as determined at step 3502), then it is determined if the set V+ is empty (3512). If the set V+ is not empty, then a positive directionality is assigned to the subobject u and a virtual function table pointer is shared between the subobject u and a subobject v in the set V+ (step 3514).

On the other hand, if the set V+ is empty, then it is determined if the set V− is empty (step 3516). If the set V− is not empty, then a negative directionality is assigned to the subobject u and a virtual function table pointer is shared between the subobject u and a subobject v− in the set V− (step 3518). On the other hand, if the set V− is empty, then it is determined if a set V* is empty (step 3520). The set V* includes subobjects in the set V having mixed directionality. If the set V* is not empty, then a mixed directionality is assigned to the subobject u and a virtual function table pointer is shared between the subobject u and a subobject v* in the set V* (step 3522). If the set V* is empty, then it is determined whether there exists a subobject v in the set V having a positive directionality (step 3524). If so, then a mixed directionality is assigned to the subobject u and a VPTR is shared between the subobjects u and v (step 3526). Otherwise, an initial directionality is assigned to the subobject u (step 3528). The method is terminated upon performing any one of steps 3514, 3518, 3522, 3526, and 3528 (step 3530).

Figure 36:
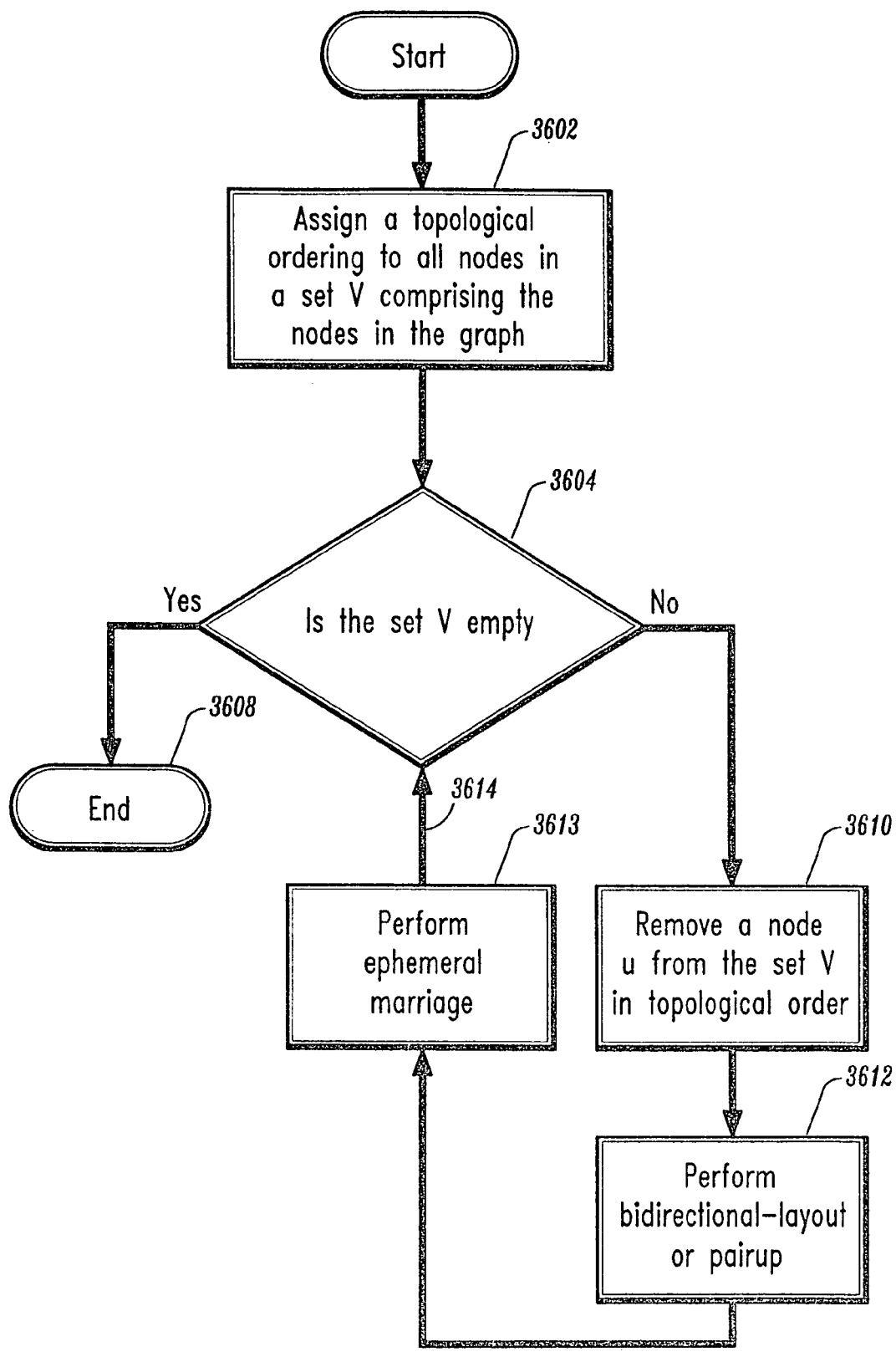
FIG. 36 is a flow chart of an overall method in which either of the procedures bidirectional layout or pairup is performed.

FIG. 36 is a flow chart of an overall method in which either of the procedures bidirectional layout or pairup is performed. A topological ordering is assigned to all nodes in a set V, the set V including subobjects in the chart (step 3602). The nodes of a directed graph are topologically ordered if each node has a number whose value is greater than the values of its parents' numbers. It is then determined if the set V is empty (step 3604). If the set V is empty, then the method is terminated (step 3608). On the other hand, if the set V is not empty, then a node u is removed from the set V in topological order (step 3610).

Next, either the procedure bidirectional-layout or the procedure pairup is performed (step 3612). Then, the procedure ephemeral marriage is performed (step 3613). A return is then made to the step of determining whether the set V is empty (i.e., step 3604) (step 3614).

Up to now, the marrying of subobjects that are inherited and have opposite directionalities has been described. However, the above techniques also apply to subobjects that are fields.

Consider a class A that has two fields F1 and F2, such that F1 has type class B and F2 has type class C. If the directionality of class B and class C are opposite, then F1 and F2 can be married and share a virtual function table pointer in an A object. This sharing is persistent; that is, F1 and F2 will continue to share a virtual functional table pointer when class A is further derived.

Finally, if classes A and B have opposite directionality, then the run-time system could marry an object of type A and an object of type B together to share a virtual function table pointer when objects of these class types are allocated.

Figure 37:
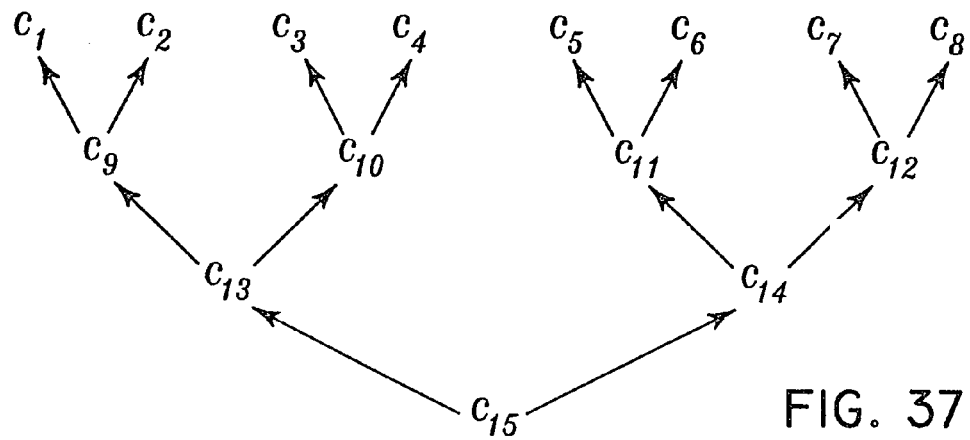
FIG. 37 is a diagram of a binary tree illustrating multiple inheritance of distinct classes.
Figure 38:
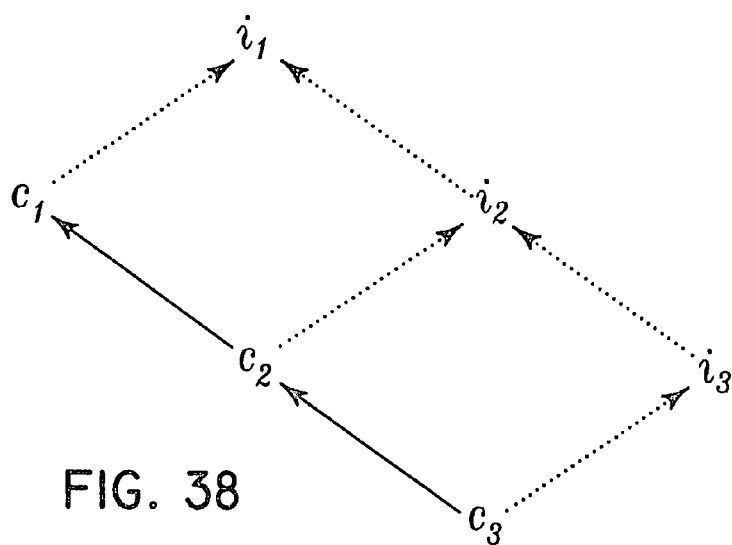
FIG. 38 is a diagram of an interface-implementation class hierarchy.
Figure 40:
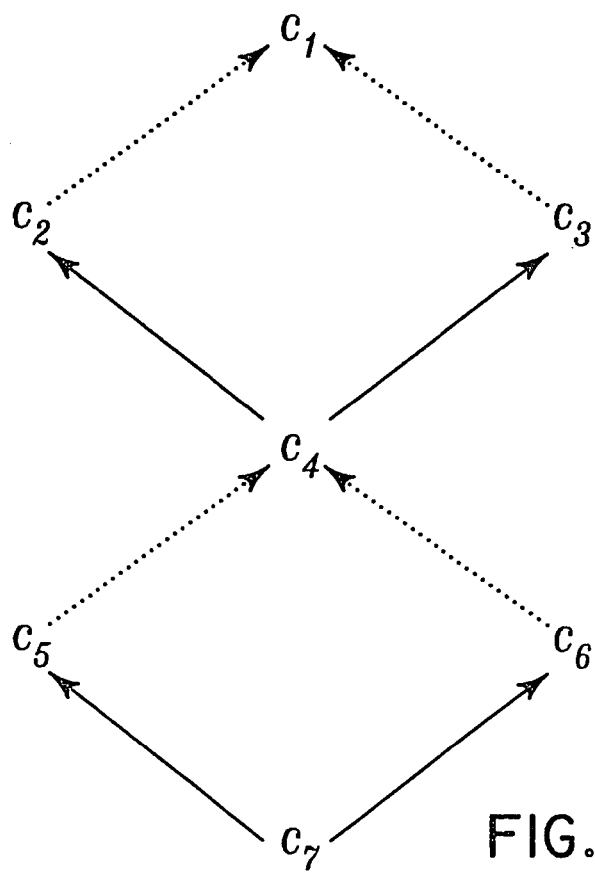
FIG. 40 is a diagram of a double diamond class hierarchy.

To illustrate the potential reduction in space overhead that our techniques can achieve, we introduce, in FIGS. 37, 38 and 40, three canonical ways that multiple inheritance may be used.

The canonical examples presented hereinafter and their variants are typical of the way that applications use multiple inheritance. Therefore, we expect that savings, similar to what we have found in our examples, will also be found in real applications.

FIG. 37 is a diagram of a binary tree illustrating multiple inheritance of distinct classes. In the traditional memory layout scheme, an object of class $c_{15}$ requires a total of 8 VPTRs. Each node can share its VPTRs with, at most, one base class. A lucky assignment of directionalities to classes $c_1, \ldots, c_8$ would reduce that number to as little as 4, which represents a 50% reduction in the compiler generated fields.

If all inheritance links in FIG. 37 were virtual then the traditional model requires 49 compiler-generated fields: 15 VPTRs (one for each class as no sharing is allowed), and 34 VBPTRs (20 of which are inessential). Applying procedure eliminate-single-VI, followed by procedure bidirectional layout, may bring this number down to four.

FIG. 38 is a diagram of an interface-implementation class hierarchy. The hierarchy represents a typical use of shared inheritance to model programming with interfaces. This is further described by L. Nackman and J. Barton, in "Base-Class Composition with Multiple Derivation and Virtual Bases", The C++ Conference, pp. 57-71, Cambridge, Mass., April 1994; and A. Myers, in "Bidirectional Object Layout for Separate Compilation", Proceedings of the 10$^{th}$ Annual Conference on Object-Oriented Programming Systems, Languages, and Applications (OOP-SLA'95), pp. 124-139, Austin, Tex., USA, Oct. 15-19 1995 (also published in ACM SIGPLAN Notices 30(10), October 1995). The inheritance hierarchy forms a ladder (in this instance with three steps) where there is an implementation inheritance of $c_1$, $c_2$ and $c_3$ and an interface inheritance of $i_1$, $i_2$ and $i_3$ such that the inheritance between implementations and interfaces, and interfaces and interfaces is virtual. The shared inheritance prevents an interface from being represented multiple times in an object of any derived class. In the traditional memory layout scheme, the overhead of multiple inheritance an object of class $c_3$ requires is 10 compiler generated fields (4 VPTRs and 6 VBPTRs). The one inessential VBPTR points from $i_3$ to $i_1$.

Figure 39:
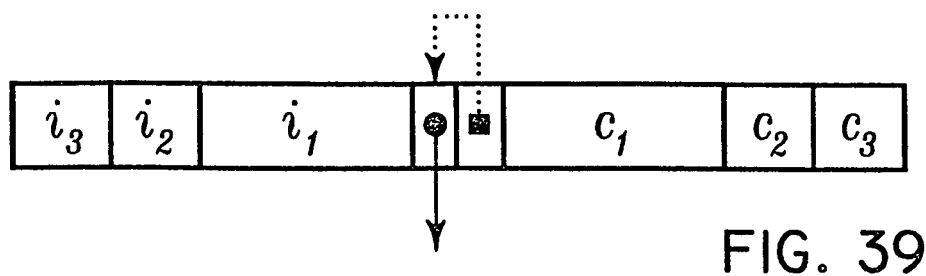
FIG. 39 is a diagram of an optimized layout of class $c_3$ of FIG. 38.

The methods of the present invention reduce this overhead by 80% to 2 compiler-generated fields: one VPTR and one VBPTR. The layout which achieves this is depicted in FIG. 39, which is an optimized layout of class $c_3$ of FIG. 38. The layout was obtained by inlining $i_1$ and $i_2$, inlining $i_2$ and $i_3$, and assigning $X^{(i1)} \leftarrow$ negative, $X^{(c1)} \leftarrow$ positive. Incidentally, this layout is very similar to the bidirectional optimized layout proposed by A. Meyers for the Theta programming language in the above referenced article entitled "Bidirectional Object Layout for Separate Compilation". The differences are that the layout optimization techniques of the present invention are general purpose, whereas the semantics of multiple inheritance in Theta is that only single inheritance is allowed for implementation inheritance.

Finally, FIG. 40 presents a portion of the class hierarchy of the C++ standard I/O library. In particular, FIG. 40 illustrates a double diamond class hierarchy.

In the tradition memory layout scheme, an object of class $c_7$ has 11 compiler-generated fields: 5 VPTRs and 6 VBPTRs. The two inessential VBPTRs point from $c_5$ and $c_6$ to $c_1$.

Figure 41:
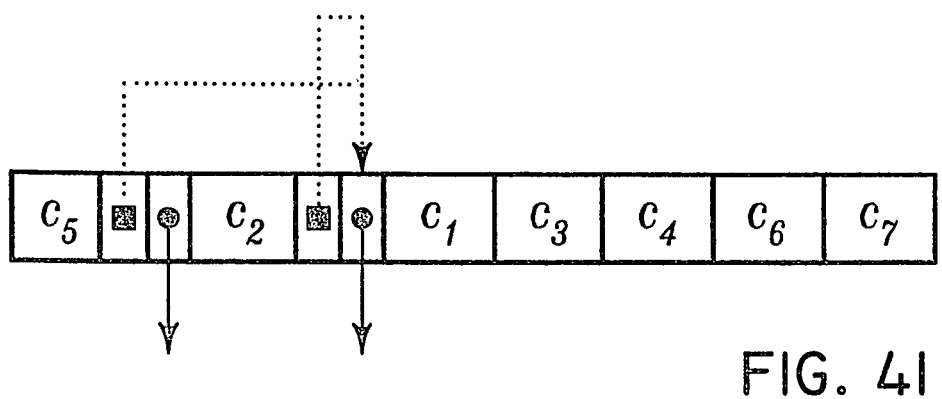
FIG. 41 is a diagram illustrating an optimized layout of class $c_7$ of FIG. 40.

Applying our techniques we see that $c_7$ can be laid out using only 4 compiler-generated fields. That is, 2 class table points and 2 virtual base pointers as illustrated in FIG. 41, which is a diagram illustrating an optimized layout of class $c_7$ of FIG. 40.

This 63% reduction is made possible by the following optimization steps:

(1) Inlining $c_1$ to $c_3$. This step represents a saving of four compiler generated fields: one VPTR (due to the sharing of a VPTR between $c_3$ and $c_1$); one essential VPTR, pointing from $c_3$ to $c_1$; and two inessential VPTRs, pointing from $c_5$ and $c_6$ to $c_1$.

(2) Inlining $c_4$ and $c_6$. This step makes it possible to share a VPTR between $c_4$ and $c_6$, and to eliminate the essential VBPTR from $c_6$ to $c_4$ for a total saving of two compiler generated fields. Note that we could also have attributed to this step the saving of the two inessential VBPTRs, which were accounted for in the previous step.

(3) Assigning directionalities to classes.

In particular, we have assigned $X^{(c1)}\leftarrow$positive, which imposed the same directionality on classes $c_3$, $c_4$, $c_6$ and $c_7$. We also assigned $X^{(c2)}\leftarrow$negative and $X^{(c5)}\leftarrow$negative. This made it possible to marry $c_2$ and $c_3$ in $c_4$ thereby saving one more VPTR.

The frugal object layout of FIG. 41 looks even more impressive when considering that it also implements the hierarchy in which all inheritance links in FIG. 40 are made virtual. In this hierarchy, which represents a typical use of shared inheritance for extendible frameworks, the tradition model requires 26 compiler-generated fields for an object of class $c_7$: 7 VPTRs, one for each class, and 19 VBPTRs, out of which 8 are essential.

Table 2 summarizes the savings provided by the optimization techniques of the present invention in each of the major hierarchy examples used thus far herein.

TABLE 2

| Example | FIG. # | a | b |
| --- | --- | --- | --- |
| Diamond | 5 | 5 | 2 |
| Binary Tree | 35 | 8 | 4 |
| Virtual Binary Tree | 35 | 49 | 4 |
| Interface Implementation | 36 | 10 | 2 |
| Double Diamond | 38 | 11 | 4 |
| Virtual Double Diamond | 38 | 26 | 4 |
| Virtual n-Chain | 10 | $n + (((n-1)(n-2))/2)$ | 1 |
| Virtual n-Double Chain | 21 | $n^2 - n + 2$ | $2n - 1$ |

Our optimization techniques were based on two principal ideas: the inlining of virtual bases whose primary savings is in the number of VBPTRs, and bidirectional object layout which gives rise to a savings in the number of VPTRs. Inlining of virtual bases required preprocessing by elimination of transitive edges. Two procedures were provided above for inlining virtual bases according to the present invention. The simple procedure (simple-inline-VB) is guaranteed to run in polynomial time and is practice expected to run in $O(n^2)$. This procedure should be run in tandem with devirtualization. The more sophisticated procedure (inline-VB) has an exponential running time, although the fact that inheritance hierarchies tend to be sparse graphs gives reasons to believe that in practice this time reduces to polynomial. The sophisticated procedure subsumes our devirtualization procedure (which, in turn, corrected a previous misconception).

Bidirectional layout, which can be run in a separate compilation environment, comes in two varieties. The first variety, which we called ephemeral marriage of virtual bases is targeted at the shared variant of multiple inheritance.

The potential impact of these techniques was demonstrated using a set of canonical examples. We have seen that a significant reduction in object space is made possible by their application.

To take a broader perspective on this work, we note that two of the most important features provided by object-oriented languages language features require run-time support. The first feature, "dynamic binding", means that the method invoked in response to a message send is determined at run-time. As shown by J. Gil and A. Itai, in "The Complexity of Object Oriented Type Analysis", Proceedings of the 11th European Conference on Object-Oriented Programming (ECOOP'98), Lecture Notes in Computer Science, Brussels, Belgium, July 1998, E. Jul, editor, Springer Verlag, it is next to impossible to eliminate run-time support for this language feature. Similarly, the next feature, "inclusion polymorphism", means that an object of a certain type can be addressed at run time as being of its super-type. However, it must be necessary to be able to cast between an object and it super-type. Inclusion polymorphism is described by L. Cardelli and P. Wegner, in "On Understanding Types, Data Abstractions, and Polymorphism", ACM Comput. Surv., 17(4): 471-522, 1985.

The language feature information that is used by the run-time system may be stored in objects, as compiler-generated fields, or in-tables associated with classes. However, even when information is stored in class tables, any object that needs that information must have a compiler-generated field to access the information from the class table.

The overheads due to dynamic binding and inclusion polymorphism are minimal when there is only single inheritance: each object contains exactly one compiler generated field; method addresses are stored exactly once in each class table; no indirection is involved in accessing data members; up-and-down-casting involve no operation; and method dispatch involves only a simple table lookup.

The combination of multiple repeated inheritance and these two features increase the incurred overheads significantly. The number of compiler generated fields per object becomes non-constant, a class may store multiple copies of a method address, casting may require a "this adjustment" (that is, an object's pointer is adjusted to point within the object from one subobject to another) and dispatch becomes more complicated. Overheads increase even more with shared multiple inheritance, since even data member access and casting may require redirection.

The challenge of implementing object oriented language is to minimize overheads of multiple inheritance of the shared and the repeated kind, bringing them as close as possible to those of single inheritance. The techniques of the present invention are concrete means to be used in meeting this challenge.

A description of related work will now be given. There are few previous attempts to optimize memory-space in C++ or in any other language which uses multiple inheritance. A technique to unidirectionally share a VPTR with a virtual base is described by M. Burke, H. Srinivasan, and P. Sweeney, in "A Framework for Evaluating Space and Time Overhead for C++ Object Models", Research Report RC 20421, IBM, T J Watson Research Center, March 1996, Declassified January 1998. A necessary condition for the applicability of their technique is that either the virtual base or the derived class have no data members. Sharing VPTR with a virtual base is another means for augmenting the traditional object layout scheme. It is orthogonal to the techniques of the present invention, and would be easily incorporated into the set of techniques described herein.

The above referenced article by D. Bacon, entitled "Fast and Effective Optimization of Statically Typed Object-Oriented Languages", describes an algorithm for devirtualization. However, as explained above, that algorithm produced an erroneous result when presented with duplicated classes.

A variant to the traditional scheme specifies that the VPTR is placed after the data members of the first class with virtual functions. The GNU CC compiler version 2.8.1. lays objects out in this way. That compiler is described by R. M. Stallman, in "Using and Porting GNU CC", The Free Software Foundation, February 1998. Another variant to the traditional scheme specifies that VBPTRs are placed in VTBLs with negative indices, while the addresses to virtual functions have positive indices. This variant is described by S. B. Lippman, in Inside The C++ Object Model, Addison-Wesley, second edition, 1996. These variants allow unidirectional sharing but do not allow bidirectional sharing, which is one of the main optimization techniques of the present invention.

A bidirectional record layout algorithm that allows a fixed offset to be assigned to each field of a record in higher-order polymorphic programming languages with multiple inheritance is described by W. Pugh and G. Weddell, in "Two-directional Record Layout for Multiple Inheritance", Proceedings of the ACM SIGPLAN'90 Conference on Programming Design and Implementation" (PLDI'90), White Plains, N.Y., pp. 85-91, June 1990 (also published as ACM SIGPLAN Notices 25(6), 1990). Their methods do not directing apply to the techniques of the present invention (or the traditional way that multiple inheritance is implemented in C++) since they do not allow a subobject to start at a different offset than its containing object. In addition, in their approach, fields, not objects, are assigned direction.

A more related work, which used bidirectional in the context of the Theta programming language whose multiple inheritance semantics are similar to that of JAVA, is described by A. C. Myers, in "Bidirectional Object Layout for Separate Compilation", Proceedings of the $10^{th}$ Annual Conference on Object-Oriented Programming Systems, Languages, and Applications (OOP-SLA'95), pp. 124-139, Austin, Tex., USA, October 15-19 1995 (also published in ACM SIGPLAN Notices 30(10), October 1995). Myers work is restricted in scope compared to the present invention. In particular, only class tables are laid out bidirectionally, while unidirectional layout is still used for objects. Furthermore, all multiple inheritance is assumed to be nonvirtual. Myers proposed the following strategies for dealing with the problem of direct access to a subobject: (i) restricting the language semantics so that, in effect, all data members are private in the C++ jargon; (ii) access to all data members is always done by indirection with offsets stored in the class table; and (iii) a hybrid approach using both (i) and (ii). The first strategy is tantamount to the demand that a class designer provides special methods to access data members, if these data members might be used by inherited classes. A time penalty in accessing data members is incurred in all of these strategies.

Hereinbelow, we have applied our techniques to a number of examples. Designing a global strategy for applying these techniques to applications is far from being trivial. This is due to two reasons. First, the techniques interact in subtle and nontrivial ways. When deciding to inline a virtual base into a derived class, the effect on bidirectional marriage should be taken into account to achieve the best result. Second, the inlining algorithms are not fully specified.

By running a maximal independent set algorithm in inline-VB presented above, we have implicitly assumed that all classes are "equal". In other words, that it is always better to inline a certain base into a set C, of classes than into a set $C_2$ if $C_1 > C_2$, regardless of the classes in each set. This hypothesis ignores the number of times classes are instantiated, either on their own, or as subobjects of other classes. Moreover, even if all classes are instantiated an equal number of times, inlining into certain classes could be better than into others. The potential saving in inessential virtual base points may make classes that have more indirect virtual bases better candidates for inlining.

Accordingly, weights could be assigned to classes, so that the maximal independent set would obtain the best results. Moreover, decisions made in one application of inline-VB on a certain class may effect decisions made in another application of this procedure on another class. This is because the same inessential VBPTR can be eliminated by two different inlining decisions. Therefore, it may be necessary to take into account global considerations in applying inline-VB.

It is to be appreciated that for steps that repeat, such as, for example, in a calling program (e.g, eliminate-single-VI) and a corresponding called program (HCD), the result of the first performance of that step (or one thereafter) may be stored in memory (e.g., in RAM 1108) for future use when the result is required again. In such a case, a future occurrence of the repeating step need not be performed. Rather, the result of the previous step may be returned from the memory.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for compiling object oriented code to produce an application having a reduced size, comprising:

determining a virtual base class of the object oriented code virtually derived by a plurality of classes, each subobject of the plurality of classes comprising a virtual base pointer to a subobject of the virtual base class;

inlining the virtual base class into at least a first class of the plurality of classes, wherein the virtual base class is stored in a fixed offset in a memory layout of the first class; and compiling the object oriented code to produce the application.

2. The method of claim 1, wherein inlining comprises:

eliminating a virtual base pointer to the subobject of the virtual base class from a memory layout of the first class; and storing the subobject of the virtual base class in the fixed offset in the memory layout of the first class in which the virtual base pointer was eliminated, wherein the subobject is shared via a virtual base pointer to the subobject at the fixed offset in the memory layout of the first class.

3. The method of claim 1, further comprising:

determining the first class derived from the virtual base class to be duplicated in a second class that inherits from the first class; and preventing inlining of the virtual base class into the first class.

4. The method of claim 1, further comprising:

determining a third class that inherits from the virtual base class through a set of classes, where each class of the set of classes virtually inherits from the virtual base class; and inlining the virtual base class into at least a second class of the set of classes.

5. The method of claim 4, wherein the set of classes is a maximal independent set.

6. The method of claim 4, where inlining comprises:
eliminating a virtual base pointer to the subobject of the virtual base class from the memory layout of the second class; and
storing the subobject of the virtual base class in a fixed offset in the memory layout of the second class in which the virtual base pointer was eliminated.

7. The method of claim 4, further comprising:
determining the second class derived from the virtual base to be duplicated in a fourth class that inherits from the second class; and
preventing inlining of the virtual base class into the second class.

8. A method for compiling object oriented code to produce an application having a reduced size, comprising:
removing transitive virtual inheritance from between a virtual base class and a first class inheriting from the virtual base class, wherein the first class inherits non-virtually from a second class and the second class inherits virtually from the virtual base class, upon determining the presence of transitive virtual inheritance;
removing single virtual inheritance from between the virtual base class and a third class virtually inheriting from the virtual base class, wherein the third class is the only class inheriting from the virtual base class, upon determining the presence of single virtual inheritance;
determining a virtual base class of the object oriented code virtually derived by a plurality of classes, each subobject of the plurality of classes comprising a virtual base pointer to a subobject of the virtual base class;
inlining the virtual base class into at least a fourth class of a plurality of classes virtually derived from the virtual base class, wherein the virtual base class is stored in a fixed offset in a memory layout of the fourth class; and
compiling the object oriented code to produce the application.

9. The method of claim 8, wherein inlining comprises:
eliminating a virtual base pointer to a subobject of the virtual base class from a memory layout of the fourth class; and
storing the subobject of the virtual base class in a the fixed offset in the memory layout of the fourth class in which the virtual base pointer was eliminated, wherein the subobject is shared via a virtual base pointer to the subobject at the fixed offset in the memory layout of the fourth class.

10. The method of claim 8, further comprising:
determining the fourth class derived from the virtual base class to be duplicated in a fifth class that inherits from the fourth class; and
preventing inlining of the virtual base class into the fourth class.

11. The method of claim 8, further comprising:
determining a seventh class that inherits from the virtual base class through a set of classes, where each class of the set of classes virtually inherits from the virtual base class; and
inlining the virtual base class into at least a sixth class of the plurality of classes that virtually inherit from the virtual base class.

12. The method of claim 11, wherein the set of classes is a maximal independent set.

13. The method of claim 11, wherein inlining comprises:
eliminating a virtual base pointer to the subobject of the virtual base class from the memory layout of the sixth class; and
storing the subobject of the virtual base class in a fixed offset in the memory layout of the sixth class in which the virtual base pointer was eliminated.

14. The method of claim 11, further comprising:
determining the sixth class derived from the virtual base class to be duplicated in a eigth class that inherits from the sixth class; and
preventing inlining of the virtual base class into the sixth class.

15. A method for compiling object oriented code to produce an application having a reduced size, comprising:
removing transitive virtual inheritance from between a virtual base class and a first class inheriting from the virtual base class, wherein the first class inherits non-virtually from a second class and the second class inherits virtually from the virtual base class, upon determining the presence of transitive virtual inheritance;
determining a virtual base class of the object oriented code virtually derived by a plurality of classes, each subobject of the plurality of classes comprising a virtual base pointer to a subobject of the virtual base class;
inlining the virtual base class into at least a third class of a plurality of classes virtually derived from the virtual base class, wherein the virtual base class is stored in a fixed offset in a memory layout of the third class; and
compiling the object oriented code to produce the application.

16. The method of claim 15, wherein inlining comprises:
eliminating a virtual base pointer to the subobject of the virtual base class from the memory layout of the third class; and
storing the subobject of the virtual base class in the fixed offset in the memory layout of the third class in which the virtual base pointer was eliminated, wherein the subobject is shared via a virtual base pointer to the subobject at the fixed offset in the memory layout of the third class.

17. The method of claim 15, further comprising:
determining the third class derived from the virtual base class to be duplicated in a fourth class that inherits from the third class; and
preventing inlining of the virtual base class into the third class.

18. The method of claim 15, further comprising:
determining a fourth class that inherits from the virtual base class through a set of classes, where each class of the set of classes virtually inherits from the virtual base class; and
inlining the virtual base class into at least a fifth class of the plurality of classes that virtually inherit from the virtual base class.

19. The method of claim 18, wherein the set of classes is a maximal independent set.

20. The method of claim 18, wherein inlining comprises:
eliminating a virtual base pointer to the subobject of the virtual base class from a memory layout of the fifth class; and
storing the subobject of the virtual base class in a fixed offset in the memory layout of the fifth class in which the virtual base pointer was eliminated.

21. The method of claim 18, further comprising:
   determining the sixth class derived from the virtual base class to be duplicated in a seventh class that inherits from the sixth class; and
   preventing inlining of the virtual base class into the sixth class.

* * * * *